(12) United States Patent
Sudoh

(10) Patent No.: US 6,470,293 B1
(45) Date of Patent: Oct. 22, 2002

(54) VOLUME CALCULATING APPARATUS AND STORAGE MEDIUM

(75) Inventor: Tomohiro Sudoh, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/385,559

(22) Filed: Aug. 30, 1999

(30) Foreign Application Priority Data

Sep. 2, 1998 (JP) ............................................ 10-248499

(51) Int. Cl.$^7$ ................................................ H04B 10/08
(52) U.S. Cl. ...................................... 702/156; 356/627
(58) Field of Search .......................... 702/155, 55, 156; 708/100, 130, 131, 132, 160, 200, 270, 272, 274, 275, 276, 277, 440, 442; 356/500, 601, 625, 627; 345/418, 419, 586, 649

(56) References Cited

U.S. PATENT DOCUMENTS

| | | | | |
|---|---|---|---|---|
| 4,794,262 A | * | 12/1988 | Sato et al. | 250/560 |
| 5,322,067 A | * | 6/1994 | Prater et al. | 128/660.07 |
| 5,524,188 A | * | 6/1996 | Halpern | 395/120 |
| 5,668,631 A | * | 9/1997 | Norita et al. | 356/376 |
| 5,806,521 A | * | 9/1998 | Morimoto et al. | 128/661.01 |
| 6,057,851 A | * | 5/2000 | Luken et al. | 345/430 |
| 6,104,411 A | * | 8/2000 | Ito et al. | 345/440 |
| 6,268,918 B1 | * | 7/2001 | Tanabe et al. | 356/376 |
| 6,271,875 B1 | * | 8/2001 | Shimizu et al. | 348/42 |
| 6,275,233 B1 | * | 8/2001 | Gueziec | 345/419 |
| 6,320,988 B1 | * | 11/2001 | Yamaguichi et al. | 382/276 |

* cited by examiner

Primary Examiner—Marc S. Hoff
Assistant Examiner—Edward Raymond
(74) Attorney, Agent, or Firm—Frishauf, Holtz, Goodman & Chick, P.C.

(57) ABSTRACT

A CPU produces a graph of a figure represented by a functional expression data input by a functional expression data input device, and displays it on a display unit. The CPU calculates and displays a volume of a body of rotation produced when the figure is rotated around a rotational axis in a range of the figure specified by a range specifying device or in a range determined based on the analysis of intersections of the figure and the rotational axis. The body of rotation is also displayed on the display unit

10 Claims, 17 Drawing Sheets

FIG.3A
$Y = \underline{x^2} , \underline{2x}$
e1    e2
FIG.3B
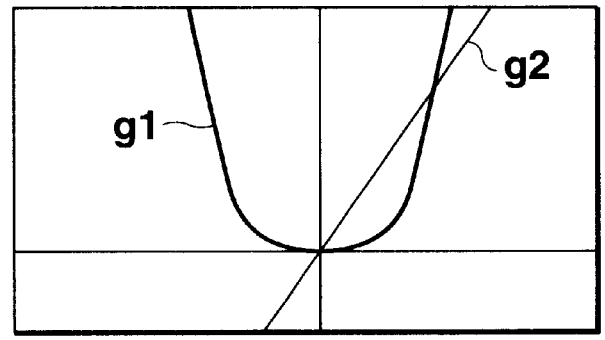
FIG.3C
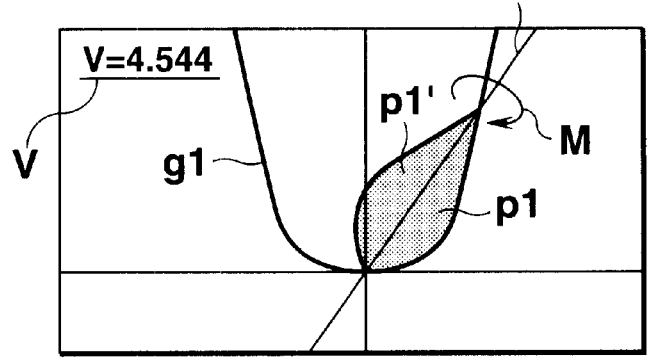

FIG.4A
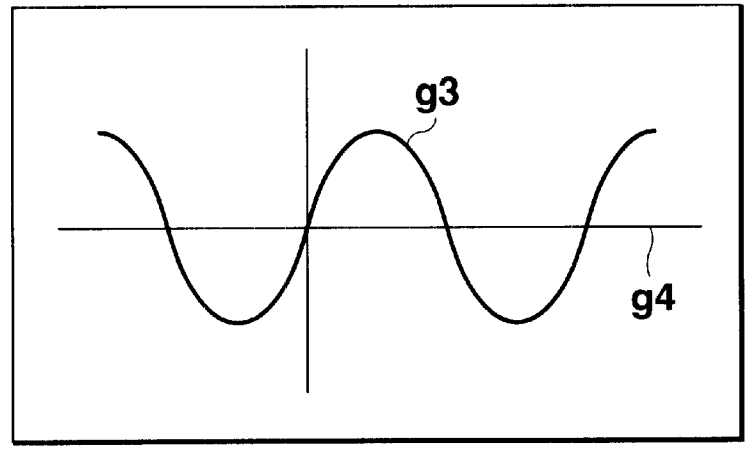
FIG.4B
$$V_e = \left[ \frac{\pi}{2}\left(x - \frac{1}{2}\sin 2x\right) \right]_b^a$$
$a =$
$b =$
FIG.4C
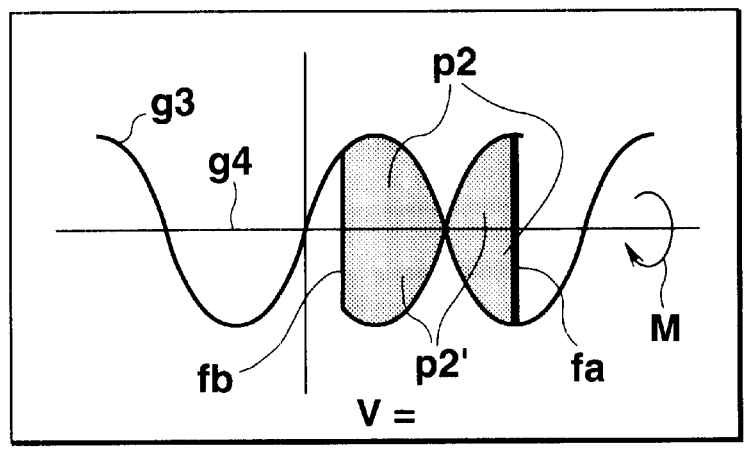

```
┌─────────────────────────────────┐
│                                 │
│   SETUP                         │
│        Axes :  x   y   z        │
│                                 │
│                                 │
└─────────────────────────────────┘
```

FIG.12A (IN A FIGURE DRAW MODE)

FIG.12B (INPUT ROTATIONAL AXIS)

INPUT EXECUTION INSTRUCTION

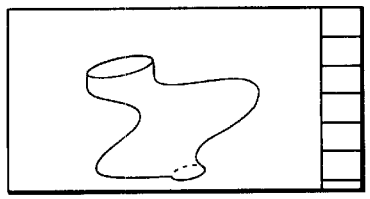
FIG.16A
```
SETUP :
SLICING WIDTH : 0,1
PICTURE SIZE : 100×100
SCALE : 1
```
FIG.16B
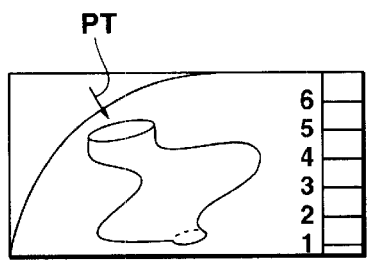
FIG.16C
FIG.16D
| | CROSS-SECTIONAL AREA |
|---|---|
| P1 | 5.175 |
| P2 | 8.425 |
| P3 | 3.689 |
| P4 | 11.225 |
FIG.16E
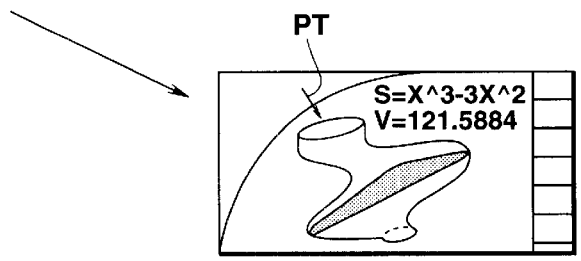
FIG.16F

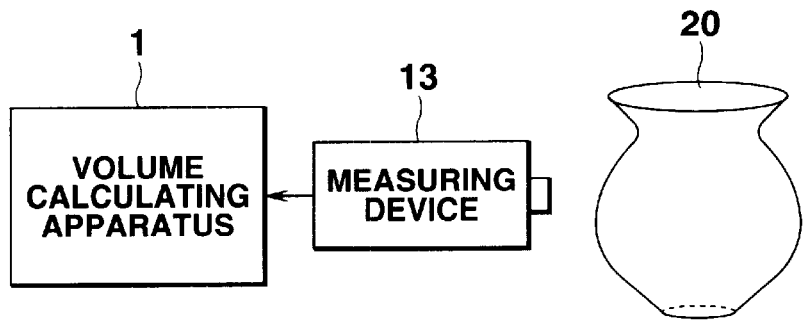
FIG.18A
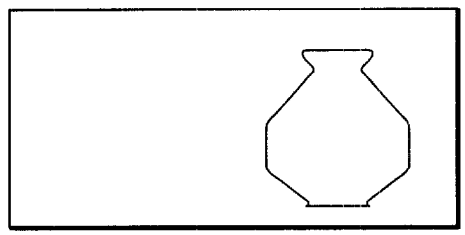
FIG.18B
FIG.18C
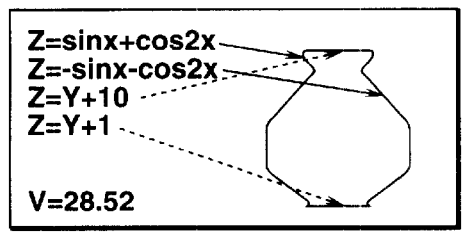
FIG.18D

VOLUME CALCULATING APPARATUS AND STORAGE MEDIUM

BACKGROUND OF THE INVENTION

The present invention relates to volume calculating apparatus and recording medium for calculating a volume of a body of rotation or a three-dimensional shape, and more particularly to such volume calculating apparatus and recording medium for calculating a volume of a body of rotation produced when a predetermined figure is rotated around a rotational axis or for calculating a volume of a solid body by analyzing a cross-sectional area of the solid body.

Conventionally, some software applications executed by a computer have been developed which have the functions of performing a function calculation, calculating an integrated value and displaying a corresponding solution, or displaying a graph based on input functional expression data, and displaying a range of its integration in a different color or display pattern.

A graph function calculator having a graph creating and displaying functions is used in a scene of education and/or/in engineer's technical calculations. The graph function calculator contains various function operating programs which create and display a graph based on an input mathematical expression and/or an input table of numerals.

The software applications and/or graph function calculators, however, only draw graphs, display solutions of function calculation, and display ranges of integration recognizably, but do not display processes for obtaining those solutions. Leaning on integration performed in a site of education covers not only calculation of an area for a graph represented by a function expression, but also production of a body of rotation by rotating a graph expressed by a functional expression around an axis and calculation of the volume of the body of rotation. The learning further includes a volume calculation in which when the rotational axis is not parallel to a coordinate axis, the functional expression and the rotational axis are linearly transformed based on a rotary matrix so as to be parallel to the coordinate axis, and in which then the volume of the body of rotation is calculated based on the transformed functional expression and rotational axes.

In the calculation of the volume, not only the volume of a body of rotation but also the volume of a solid body can be calculated by integrating a functional expression indicative of a cross-sectional area concerned. However, it is not easy to draw cross-sectional shapes of the solid body as viewed in various directions. This greatly hinders the understanding of analysis of a cross-sectional area of the solid body.

SUMMARY OF THE INVENTION

It is therefore an object of the present invention to provide a volume calculating apparatus and a recording medium capable of displaying a body of rotation produced when a predetermined figure (a graph of a function, a drawn figure or the like) is rotated around a predetermined rotational axis.

Another object of the present invention is to provide a volume calculating apparatus and a recording medium capable of calculating a volume of a body of rotation produced when a predetermined figure (a graph of a function, a created figure or the like) is rotated around a predetermined rotational axis.

A further object of the present invention is to provide a volume calculating apparatus and a recording medium capable of calculating a volume of any solid body.

A still further object of the present invention is to provide a volume calculating apparatus and a recording medium capable of clearly displaying a cross section of any solid body in any direction.

BRIEF DESCRIPTION OF THE DRAWINGS

FIG. 3A shows a functional expression input picture appearing on a display unit in the calculating apparatus of the first embodiment;

FIG. 3B shows a graph of a functional expression drawn on the display unit and a related rotational axis;

FIG. 3C shows one example of a body of rotation displayed two-dimensionally and a calculated volume of the body of rotation;

FIG. 4A shows a functional expression graph and a rotational axis displayed on the display unit when the number of intersections of the graph and the rotational axis is not two;

FIG. 4B shows a mathematical expression Ve representing the volume of the body of rotation and a range input displayed on the display unit 6 when the number of intersections is not two;

FIG. 4C shows one example of the body of rotation related to FIGS. 4A and B;

FIG. 12A shows a figure input on a figure drawing picture in the third embodiment;

FIG. 12B shows a rotational axis further input to the figure drawing picture;

FIG. 14A illustrates a picture of a cross-sectional area function expression input when the volume of a solid body is calculated in the fourth embodiment;

FIG. 14B shows one example of a displayed volume along with the cross-sectional area function expression;

FIG. 16A shows a solid body whose volume is calculated by analyzing a functional expression which represents a cross-sectional area of the displayed solid body in the fourth embodiment;

FIG. 16B shows a display picture on which a slicing width, a picture size and a scale are specified and input;

FIG. 16C shows a pointer which points to a direction perpendicular to a direction in which the solid body is cut;

FIG. 16D shows a cross section of the solid body;

FIG. 16E shows a list of cross-sectional area data stored;

FIG. 16F shows one example of a functional expression representing the cross-sectional area, and a volume of the solid body;

FIG. 18A shows a volume calculating apparatus with a measuring device for calculating the volume of the object in the fifth embodiment;

FIG. 18B shows a list of distance data measured by the measuring device and stored;

FIG. 18C shows an object whose outline is indicated in a curve or straight line segments in the process of the fifth embodiment;

FIG. 18D shows one example of functional expressions representing the shape of the object, and a calculated volume, along with the indicated object outline.

DESCRIPTION OF THE PREFERRED EMBODIMENTS

First Embodiment

Referring to FIGS. 1–8, a volume calculating apparatus 1 in a first embodiment of the present invention will be described next in detail.

Figure 1:
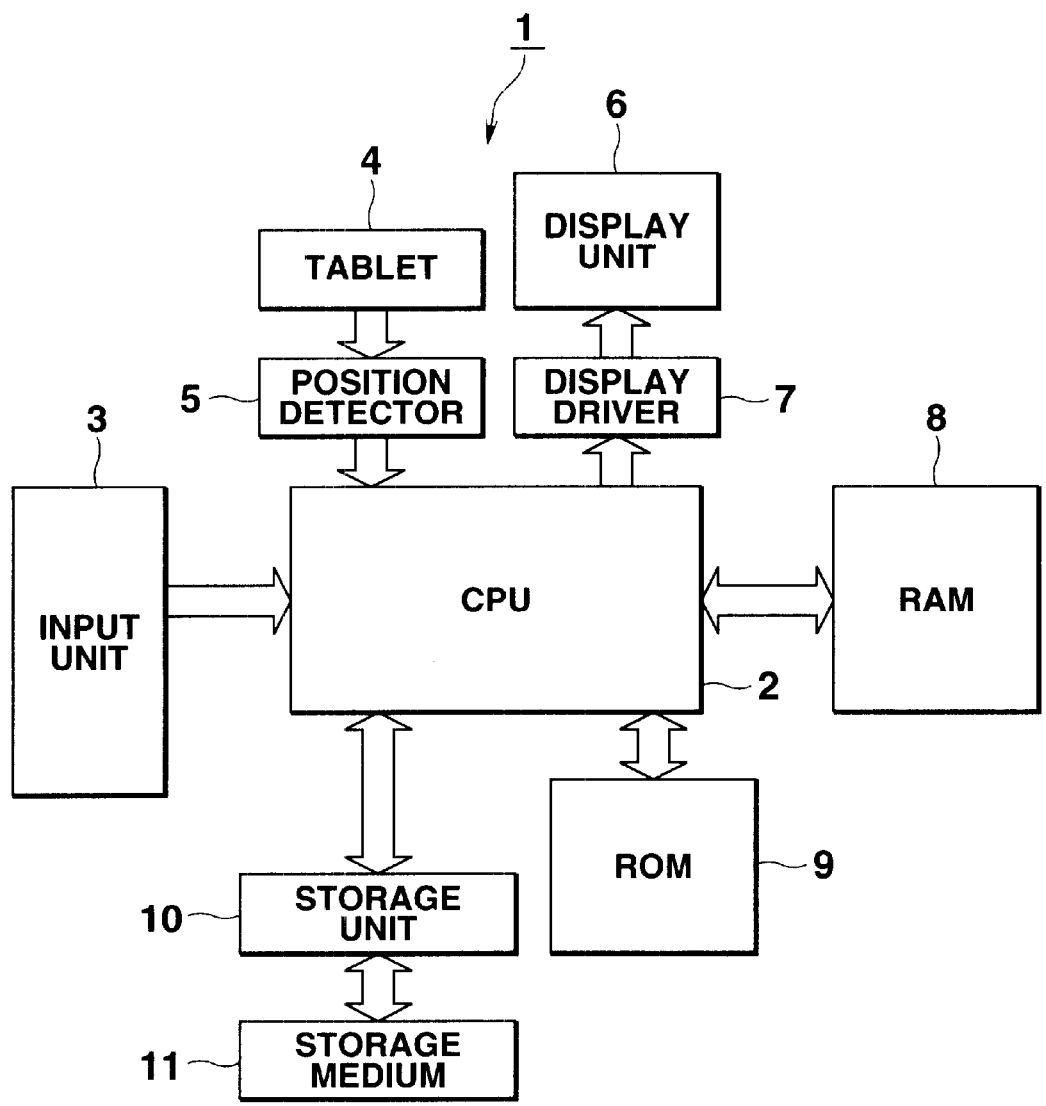
FIG. 1 is a block diagram of a volume calculating apparatus as a first embodiment of the present invention.

First, the composition of the apparatus 1 will be described. FIG. 1 is a block diagram of the volume calculating apparatus 1. In FIG. 1, the volume calculating apparatus 1 includes a CPU 2, an input unit 3, a tablet 4, a position detector 5, a display unit 6, a display driver 7, a RAM 8, a ROM 9, a storage device 10, and a recording medium 11.

The CPU 2 reads a predetermined program from the ROM 9 or storage device 10 in accordance with an instruction input at the input unit 3, temporarily stores it in the RAM 8, performs various processes based on the program, stores the result of the processing in a work area of the RAM 8, displays the result of the processing on the display unit 6 via the display driver 7, and controls the respective elements of the volume calculating apparatus 1 in a centralized manner. The CPU 2 stores the result of the processing via the storage device 10 in the recording medium 11 in accordance with an instruction inputted at the input unit 3.

In a volume calculating process (FIG. 2) to be described later, the CPU 2 produces data representing a graph of a functional expression based on the input functional expression data, and displays it on the display unit 6, calculates coordinates of intersections of a specified rotational axis and the graph, and determines the number of intersections. If there are two intersections (FIG. 3), the CPU 2 displays two-or three-dimensionally on the display unit 6 a body of rotation, produced when a figure surrounded by the graph and the rotational axis is rotated around the rotational axis, and calculates a volume of the body of rotation. When the number of intersections is only one or three or more (FIG. 4), the CPU 2 displays on the display unit 6 the volume of the body of rotation expressed in a mathematical expression and a range input picture for a range in which the volume of the body of rotation is to be calculated. When the range is specified, the CPU 2 calculates the volume of the body of rotation and displays the calculated volume on the display unit 6.

More specifically, when functional expression data to be operated on and functional expression data representing a straight line to be used as a rotational axis are input at the input unit 3 or tablet 4 (FIG. 3A), the CPU 2 determines whether there are errors involved in a form in which the functional expression data is input, or whether there are any mathematical errors involved in setting the functional expression and/or the rotational axis. For example, if only a range of integration is input in an input column in which a function is to be input, a form error appears on the display unit 6. If a functional expression indicative of a curve is input in a functional expression for a rotational axis, a mathematical error appears on the display unit 6.

The CPU 2 stores the input functional expression data in a work area (not shown) of the RAM 8, produces data on graphs expressed by those functional expression data, and outputs them to the display driver 7, which then displays them on the display unit 6 (FIG. 3B). The CPU 2 calculates the coordinates of intersections between a graph-represented by functional expression data and the rotational axis, and determines the number of those intersections. As a result, when there are two intersections, the CPU 2 performs a body of rotation displaying process (FIG. 5) which will be described later, performs a process for calculating the volume of the body of rotation (FIG. 6), stores data on the results of the respective processing in the work area of the RAM 8, and displays them on the display unit 6 (FIG. 3C).

In the body of rotation displaying process (FIG. 5), the CPU 2 produces a figure surrounded by a graph expressed by functional expression data and its rotational axis, a figure (FIG. 3C) which is axial-symmetrical about the rotational axis of the figure, displays those figures on the display unit 6, in a color or display pattern different from that of the remainder of the picture, and also displays the rotational axis with a rotation mark.

In the calculating process (FIG. 6), the CPU 2 calculates a volume of the body of rotation. More particularly, the CPU 2 substitutes a lower limit value of a specified range (when there are two intersections, a smaller one of the x-coordinates of the intersections) into the functional expression, calculates a distance Lx between the rotational axis and the graph of the function at the substituted value, then calculates a product of the area of a circle having a radius equal to the distance Lx and a value of a slicing width ($\pi Lx^2 \times$slicing width), and sequentially adds the results of those calculations to obtain a value of the volume of the body of rotation. The slicing width implies a predetermined width with which the figure is sliced, and beforehand set in the ROM 9 or set by the user. For example, when one scale of the x-coordinate axis is equally divided into 10 for calculating purposes, the slicing width is 0.1.

The input unit 3 comprises a keyboard which is composed of character input keys, numeral input keys, up, down, right and left move keys, various function keys, etc., and when any one of those keys is depressed, outputs a corresponding depression signal to the CPU 2.

The tablet 4 is an input device which comprises a combination of a device which indicates coordinates of an input pen or the like and a plate-like device which senses the indicated coordinates. The position coordinates indicated by the input pen is detected by the position detector 5 in an electromagnetic induction system, magnetostriction system or pressure sensitive system. The tablet 4 is integral with the display unit 6. An input operation is performed by directly pointing, with the input pen, to one of icons or the like displayed on the display unit 6.

The display 6 includes an LCD (Liquid Crystal Display) which performs various displays based on drive signals received from the display driver 7, which produces drive signals based on display data received from the CPU 2 to control the display of the display unit 6.

The RAM 8 includes a work area which temporarily stores a specified application program, an input instruction, input data and the results of various processing operations.

The ROM 9 contains basic programs corresponding to the volume calculating apparatus 1. More specifically, it contains an initial display menu program performed when a power supply (not shown) of the volume calculating apparatus 1 is turned on, various function operating programs, a volume calculating program to be described later, which are basic programs whose rewriting is not required.

The storage device 10 contains a recording medium 11 which stores programs/data. The recording medium 11 includes a magnetic or optical one or a semiconductor memory. The recording medium 11 is fixed to, or removably set in, the storage device 10. The recording medium 11 contains or stores various processing programs corresponding to the volume calculating apparatus 1 and data processed by the respective processing programs.

The programs/data stored in the recording medium 11 may be received through a telecommunication line from another device or from a recording medium set in a storage device of another apparatus.

The operation of the volume calculation apparatus 1 will be described next.

Figure 2:
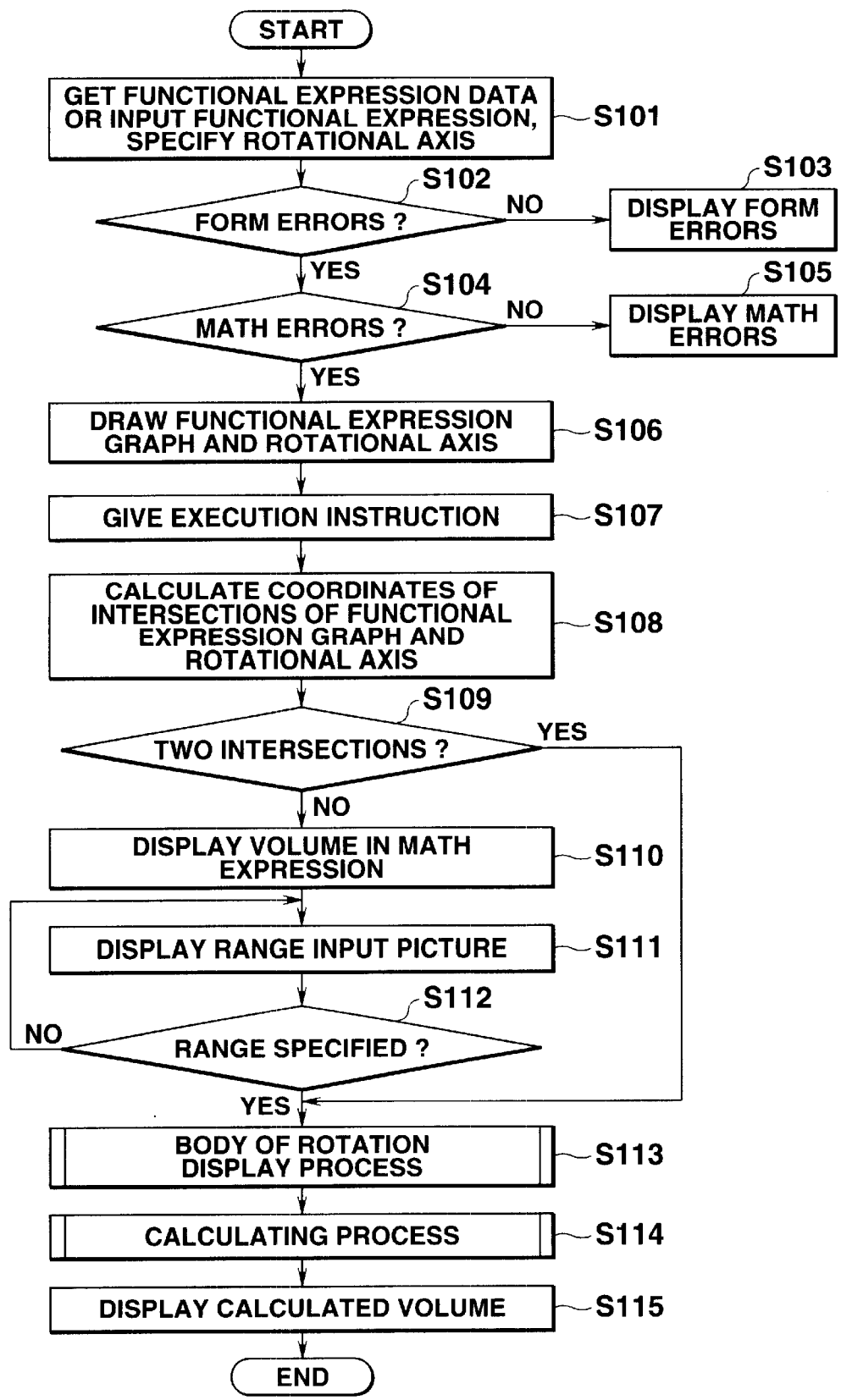
FIG. 2 is a flowchart of a volume calculating process performed by the volume calculating apparatus of FIG. 1.

FIG. 2 is a flowchart of a volume calculating process performed by the volume calculating apparatus 1 of the first embodiment. FIG. 3A shows a functional expression input picture appearing in the volume calculating process. FIG. 3B shows a graph of a functional expression drawn on the display unit and a related rotational axis. FIG. 3C shows one example of a body of rotation displayed two-dimensionally and a calculated volume of the body of rotation;

In the volume calculating apparatus 1, the ROM 9 contains a program for selecting one of various items of a menus. When a function operating menu is selected by key manipulation at the input unit 3, the CPU 2 reads out a predetermined program from the ROM 9 and displays a functional expression input picture on the display unit 6 through the display driver 7. When functional expression data e1 to be operated on and functional expression data e2 indicative of a rotational axis concerned are input in a predetermined form to the functional expression input picture at the input unit 3, as shown in FIG. 3A, the functional expression data e1 and e2 are stored in the work area of the RAM 8 (step S101).

The CPU 2 then checks whether there are any errors involved in the input functional expressions e1 and e2 (step S102). If so (step S102; No), the CPU 2 displays the presence of the form errors on the display unit 6 (step S103). If not (step S102; Yes), the CPU 2 then analyzes the input functional expression data e1 and e2 to check whether there are any mathematical errors involved in the functional expression data e1 and e2 (step S104). If so (step S104; No), the CPU 2 displays the presence of mathematical errors on the display unit 6 (step S105). If not (step S104; Yes), the CPU 2 produces graph data for displaying a graph g1 expressed by the functional expression data e1 to be operated on, and a rotational axis g2 expressed by functional expression data e2, outputs those graph data to the display driver 7, displays the graph g1 indicative of the functional expression data e1 and the rotational axis g2 on the display unit 6 (step S106) (FIG. 3B) Then, when an execution instruction is given by key manipulation at the input unit 3 (step S107), the CPU 2 produces a body of rotation and calculates its volume, and displays on the display unit 6 the body of rotation and the calculated volume value. That is, the CPU 2 detects coordinates of intersections of the graph g1 indicative of the functional expression and the rotational axis g2, and stores those coordinates in the work area of the RAM 8 (step S108). Then, the CPU 2 calculates the number of intersection coordinates stored in the RAM 8, and determines whether the number of intersections is two (step S109).

If so (step S109; Yes), the CPU 2 performs a body of rotation displaying process to be described later (FIG. 5), displays on the display unit 6 a body of rotation of FIG. 3C (expressed by a figure P1 and a figure P1' axial-symmetrical about the axis g2 in FIG. 3C) (step S113), performs the calculating process to be described later (FIG. 6) to obtain a volume of the body of rotation (step S114), and displays the calculated volume V on the display unit 6 (step S115).

FIG. 4A illustrates a graph of a functional expression g3 represented by y=sinx and a graph representing a rotational axis g4 which is the x-axis. FIG. 4B shows a mathematical expression Ve which represents the volume of the body of rotation produced when the graph g3 is rotated around the rotational axis g4, and a range input picture. FIG. 4C shows one example of the body of rotation produced in a range input to the range input picture (shown by the axial-symmetrical figures P2 and P2').

As shown in the example of FIG. 4A, when the CUP 2 determines that the number of intersections of the functional expression graph g3 and the rotational axis g4 is not two (step S109; No), the CPU 2 analyzes the functional expression data (y=sinx) and the functional expression data indicative of the rotational axis (x-axis), obtains a mathematical expression Ve indicative of the volume of the body of rotation and displays it on the display unit 6, as shown in FIG. 4B (step S110), simultaneously displays on the display unit 6 a range input picture to which a range in which the volume is calculated is input (step S111). If the range is specified (step S112; Yes), the CPU 2 performs a body of rotation displaying process (FIG. 5) which includes displaying as a body of rotation a combination of a figure P2 surrounded by the functional expression graph g3, rotational axis g4 and range indicating straight lines fa and fb, and a figure P2' which is axial-symmetrical about the rotational axis g4 to the figure P2 as shown in FIG. 4C, (step S113), calculates a volume V of the body of rotation in the range input to the range input picture in a calculating process to be described later (step S114), displays the calculated volume V (step S115), and then terminates the volume calculating process.

Figure 5:
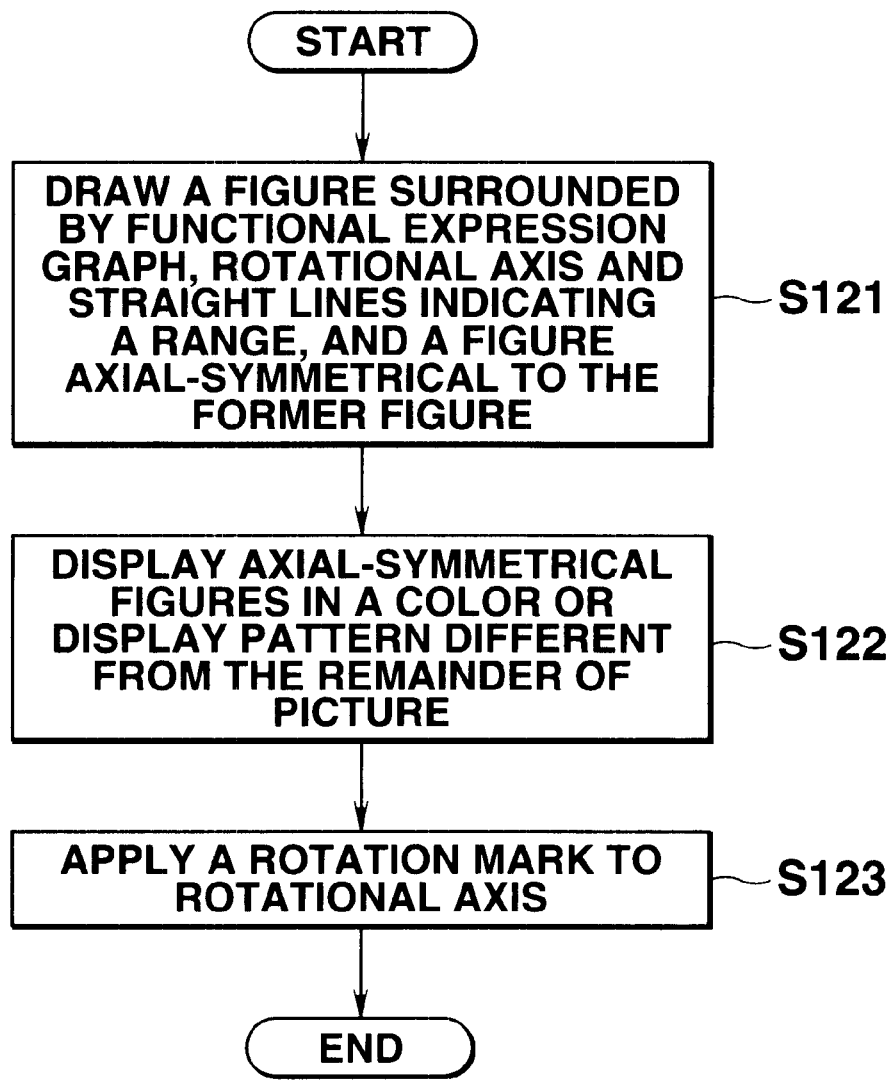
FIG. 5 is a flowchart of a body of rotation displaying process performed by the volume calculating apparatus of the first embodiment.

FIG. 5 is a flowchart of the body of rotation displaying process performed by the volume calculating apparatus 1 in the first embodiment.

In the body of rotation displaying process, the CPU 2 produces data displaying the body of rotation, outputs this display data to the display driver 7, which displays the body of rotation on the display unit 6. When there are two intersections, the CPU 2 produces display data representing a figure P1 surrounded by the functional expression graph g1 and the rotational axis g2, and a figure P1' symmetrical to the figure P1 about the rotational axis g2, as shown in FIG. 3C. When there is one or three intersections, the CPU 2 produces display data representing a figure P2 surrounded by straight lines fa and fb indicative of a range input to the range input picture, the functional expression graph g3, and the rotational axis g4, and a figure P2' symmetrical to the figure P2 about the rotational axis g4, as shown in FIG. 4C. The CPU 2 outputs those respective display data to the display driver 7, and displays the figures P1, P1' or P2, P2' on the display unit 6 (step S121) The CPU 2 then displays the figures P1 and P1' or figures P2 and P2' in a color or display pattern different from that of the remainder of the picture (step S122), and displays the rotational axis g2 or g4 with a rotation mark M (step S123).

Figure 6:
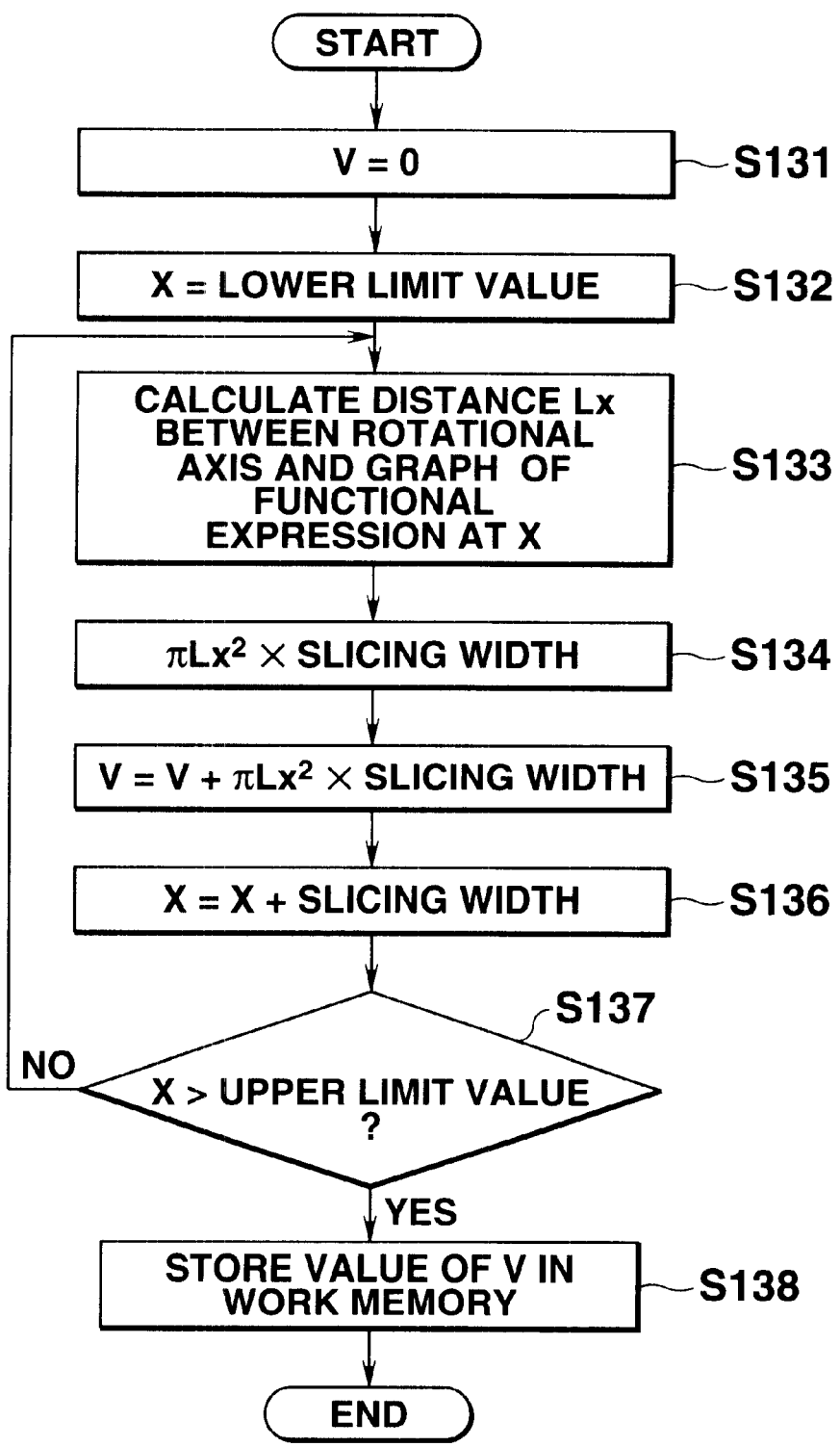
FIG. 6 is a flowchart of a calculating process performed by the volume calculating apparatus of the first embodiment.

FIG. 6 is a flowchart of the calculation process performed by the volume calculating apparatus 1 of the first embodiment.

First, the CPU 2 sets a value V indicative of a volume at zero (step S131), sets a lower limit value of the range in a value X to be substituted into the functional expression (X=the lower limit value) (step S132; when there are two intersections, a smaller one of the x-coordinates of the intersections is substituted) and calculates a distance Lx between a point indicated by the substituted value X on the rotational axis g2 and the functional expression graph g1 (step S133). Then, the CPU 2 calculates the area of a circle using the distance Lx as a radius ($\pi Lx^2$), and then further calculates a product of the area of the circle and a predetermined slicing width ($\pi Lx^2 \times$slicing width) (step S134). Then, the CPU 2 adds the value ($\pi Lx^2 \times$slicing width) to a volume (V=V+$\pi Lx^2 \times$slicing width) (step S135), and then adds a value of the slicing width to the substituted value X (X=X+slicing width) (step S136).

The CPU 2 then determines whether the substituted value X is larger than an upper limit value of the range (when there are two intersections, the upper limit of the range is a larger one of the intersection x-coordinates) (step S137). If not (step S137; No), the CPU 2 repeatedly performs the calculations at steps S133–S136 (calculation of the distance Lx, $\pi Lx^2 \times$slicing width, V=V+$\pi Lx^2 \times$slicing width, and X=X+slicing width). When the substituted value X then exceeds the upper limit value (step S137; Yes), the CPU 2 stores the value of the volume V in the work memory of the RAM 8 (step S138), and then terminates this calculating process.

As described above, in the first embodiment, when the functional expression data e1 and functional expression data e2 indicative of the rotational axis are input, the volume calculating apparatus checks whether there are form errors and mathematical errors involved in the functional expression data e1 and e2, draws the functional expression graph g1 and the rotational axis g2, analyzes the intersections of the functional expression graph g1 and the rotational axis g2 in accordance with an instruction of execution due to key manipulation at the input unit 3, determines a range where the body of rotation is produced, depending on the number of those intersections (when there are two intersections, the smaller and larger ones of x-coordinates of the intersections are employed as a lower and an upper limit value, respectively. If the number of those intersections is not two, the CPU 2 determines the range where the body of rotation is produced, depending on the input range), displays the body of rotation produced when the functional expression graph g1 is rotated around the rotational axis g2 in the input range, calculates the volume of the body of rotation in the calculating process, and displays the value of the calculated volume on the display unit 6.

Thus, according to the volume calculating apparatus 1 of the first embodiment, the volume of the body of rotation produced when the graph expressed by the input functional expression is rotated around its input rotational axis can be easily calculated, and the rotational axis can be specified as any straight line. Even in a relatively advanced learning of calculation of a volume of a body of rotation, the volume can be easily calculated to thereby increase the. utility of the volume calculating apparatus. Since the body of rotation is displayed two-dimensionally, the body of rotation can be recognized visually to thereby smoothly learn the calculation of the volume of the body of rotation. When the rotational axis and the functional expression graph intersect at two points, the volume of the body of rotation can be calculated, using an area between the intersections as a range in which the body of rotation is to be produced, even if this range is not input. Thus, the user can omit inputting that range and hence calculate the volume of the body of rotation in an easy manner.

Figures 7, 8:
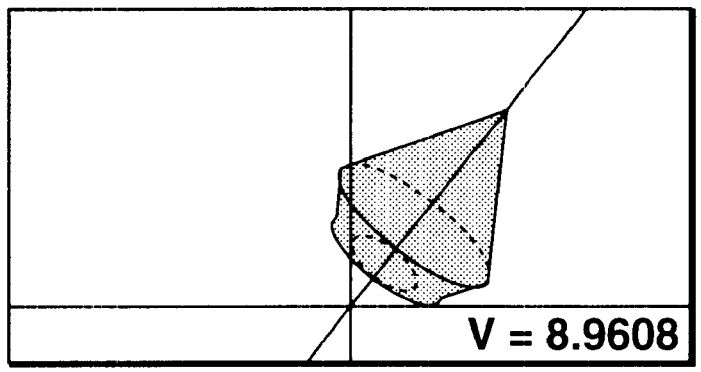
FIG. 7 illustrates one example of a rotational axis specifying picture in which a coordinate axis is specified as the rotational axis in the first embodiment.
FIG. 8 shows one example of a process for producing a body of rotation displayed three-dimensionally with the time.

While in the first embodiment the rotational axis is illustrated as being determined by the functional expression data input to the functional expression data input picture, the coordinate axis can be selected and specified as the rotational axis for producing the body of rotation from among the coordinate axes (x-, y-, and z-axes in the rectangular coordinate system; r-axis in the polar coordinate system), for example, used for display of a graph, as shown in FIG. 7, or a preset axis may be used as the rotational axis. In the initial state of the learning of calculation of a volume of a body of rotation performed in general scenes of education, the learning of calculating the volume of a body of rotation, using one of the coordinate axes as the rotational axis, is performed often, and the learning can be smoothly introduced.

In the body of rotation displaying process, the body of rotation may be displayed in two dimensions as well as in three dimensions. In addition, the process of producing the body of rotation may be displayed three-dimensionally with time. For example, as shown in FIG. 8, when a body of rotation is displayed three-dimensionally in an x-, y-, z-rectangular coordinate system, the x-, y-, and z-coordinates of each point on the body of rotation are calculated based on the functional expression, and, for example, the coordinate system is slightly rotated around the y-axis to shift the point of the viewpoint to thereby display the body of rotation. In addition, by shading the body of rotation, or by changing the brightness of the color of the surface of the body of rotation depending on the position of a light source, an angle of a surface of the body of the rotation, etc., the body of rotation is displayed three-dimensionally. Thus, the shape of the body of the rotation can be easily recognized even in the direction of its depth to thereby understand the shape of the body of rotation more practically.

When the body of rotation is displayed three-dimensionally with time, the figure to be rotated is displayed in a color or display pattern different from that of the remainder of the picture, a locus is calculated in which the figure is then drawn when the figure is rotated around its rotational axis, the locus is gradually displayed in the same color or display pattern as the figure, starting from one end of the calculated locus each time a predetermined time has elapsed to thereby update the display gradually.

By displaying the body of rotation changing with time, as described above, the image that the body of rotation is produced as a result of rotating a plane figure around its rotational axis can be easily understood by the learners. From what plane figure what cubic figure is produced can be displayed in a simple operation, and the understanding of the whole learning of the body of rotation is promoted.

Second Embodiment

Figure 9:
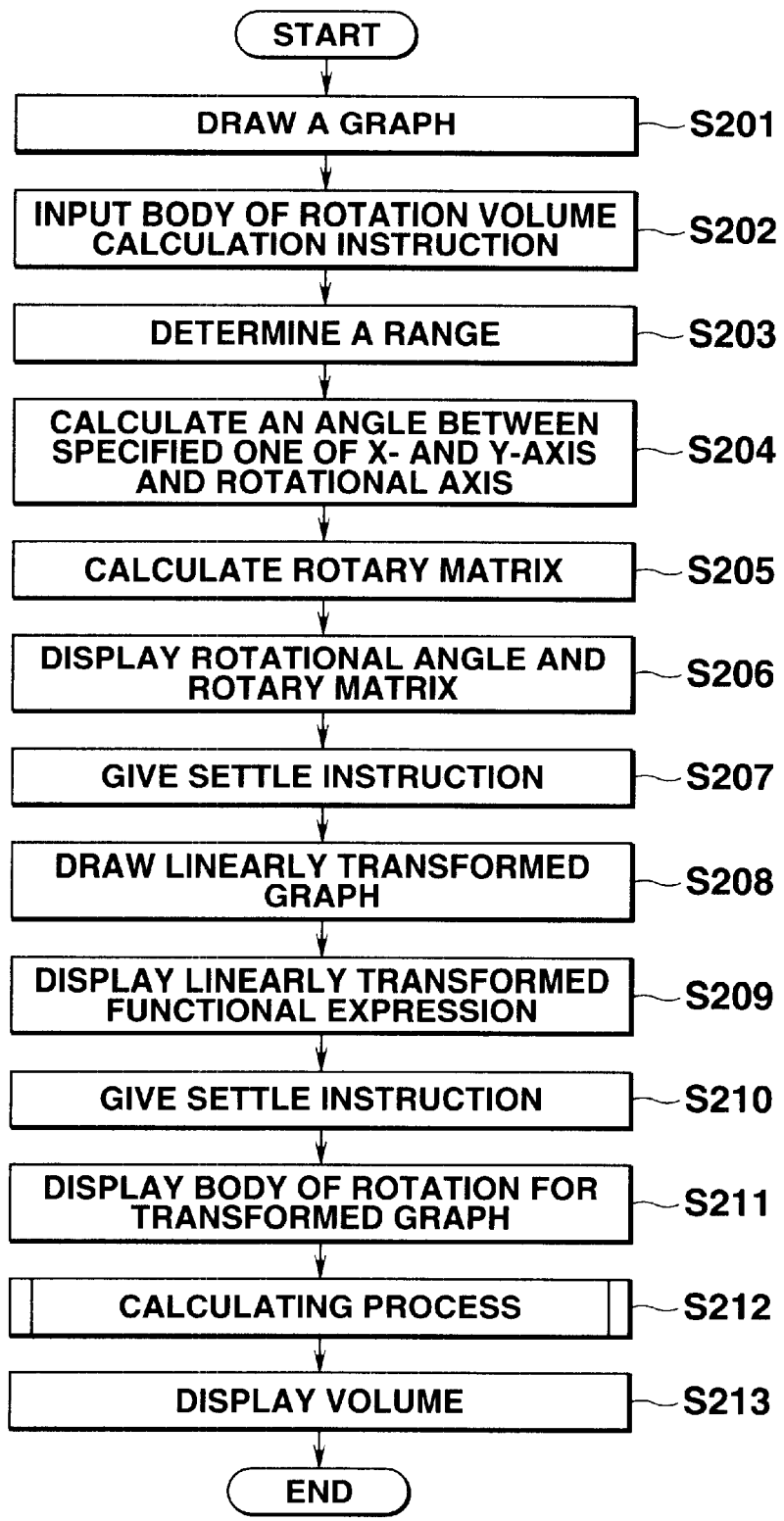
FIG. 9 is a flowchart of a rotation displaying process performed in second embodiment.

Referring to FIGS. 9 and 10, a second embodiment of the volume calculating apparatus 1 according to the present invention will be described. The same reference numeral is used to identify the same component of the volume calculating apparatus of the first and second embodiments.

When a volume of a body of rotation whose rotational axis is not parallel to a coordinate axis is calculated in a real scene of education which uses the volume calculating apparatus 1 according to the present invention, a method is learned in which (1) a figure, on the basis of which the body of rotation is to be produced, is linearly transformed such that the axis of the transformed figure is parallel to the coordinate axis, (2) the body of rotation is produced, and (3) its volume is then calculated. When the figure is rotated, a rotary matrix is produced for an angle θ through which the figure is rotated, a linearly transformed functional expression is calculated on the basis of the rotary matrix, a graph of the linearly transformed functional expression is produced, the body of rotation is produced from the linearly transformed figure, and its volume is then displayed. Thus, in the volume calculating apparatus 1 of the first embodiment, it is effective to sequentially display the steps of a body of rotation volume calculating process, which includes producing a rotary matrix, linearly transforming the functional expression on the basis of the produced rotary matrix, the linearly transformed functional expression, its graph and rotational axis and then calculating and displaying the volume of the body of rotation.

In the second embodiment, the CPU 2 performs the same body of rotation displaying process and calculating process, as are described with reference to the first embodiment, and further calculates an angle between the rotational axis and the coordinate axis, and a rotary matrix based on the angle, displays on the display unit 6 the calculated angle and rotary matrix, linearly transforms the functional expression based on the rotary matrix, displays the linearly transformed functional expression and its graph, and then calculates and displays a volume of the body of rotation produced when the graph of the linearly transformed functional expression is rotated around its linearly transformed rotational axis.

Operation of the second embodiment will be described next. FIG. 9 is a flowchart of a rotation displaying process performed by the volume calculating apparatus 1 of the second embodiment.

When functional expression data and rotational axis data are input to the functional expression data input picture (FIG. 3A), the CPU 2 detects possible form errors and mathematical errors involved in those data. When the CPU 2 determines that there no form errors and mathematical errors, it produces graph data to display the functional expression and rotational axis data, outputs the graph data to the display driver 7 which then displays the graph data on the display unit 6 (step S201). Then, when a body of rotation volume calculating instruction is input at the input unit 3 (step S202), a range in which the body of rotation is to be produced is determined on the basis of a range based on the determination of the number of intersections or a range input to the rage input picture, as described above (step S203).

Then, the CPU 2 calculates an angle θ between the rotational axis and a preset coordinate axis or a coordinate axis specified from among coordinate axes (for example, x- and y-axes) which compose a coordinate system used for drawing graphs (step S204). The CPU 2 further calculates a rotary matrix for the angle θ by substituting the calculated angle θ into the following mathematical expression (step S205):

$$\begin{pmatrix} \cos\theta & -\sin\theta \\ \sin\theta & \cos\theta \end{pmatrix}$$

Then, the CPU 2 stores the calculated angle θ and the rotary matrix in the work area of the RAM 8, and also displays them on the display unit 6 (step S206).

When a settle instruction is input at the input unit 3 (step S207), the CPU 2 linearly transforms the functional expression and the rotational axis to a second functional expression and a second axis, respectively, obtains graph data indicative of the second functional expression and rotational axis, provides those data to the display driver 7 to cause same to display the graphs (step S208), and also to display the second functional expression (step S209).

Thereafter, when a settle instruction is again input at the input unit 3 (step S210), the CPU 2 performs the body of rotation displaying process (FIG. 5), and displays a body of rotation produced when the graph of the second functional expression is rotated around the second rotational axis in the range determine at step S203 (step S211). The CPU 2 also performs the process for calculating the volume of the body of rotation of FIG. 6 to obtain the volume of the body of rotation (step S212), stores the volume data in the work area of the RAM 8, and displays this data on the display unit 6 (step S213).

FIGS. 10A–D show examples of transition of pictures appearing on the display unit in calculating a volume of a body of rotation produced by rotating and displaying a graph of a functional expression, its rotational axis, and a figure surrounded by the graph and the rotational axis such that the rotational axis is parallel to the x-axis in the second embodiment.

Figure 10A:
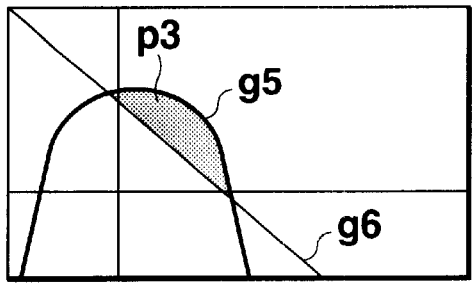
FIG. 10A illustrates a graph and a rotational axis displayed in the second embodiment.

When data on a functional expression to be rotated and on a functional expression indicative of its rotational axis are input on the functional expression data inputting picture and predetermined error detection is terminated, the CPU 2 produces graph data based on those functional expression data, outputs them to the display driver 7, which displays on the display unit 6 the functional expression graph g5 and its rotational axis g6, as shown in FIG. 10A. Then, when a body of rotation volume calculation executing instruction is input at the input unit 3, the CPU 2 determines the number of intersections of the graph g5 and the rotational axis g6, and determines a range in which the body of rotation is produced. Since the number of those intersections is two in the example of FIG. 10A, a figure P3 surrounded by the function graph g5 and the rotational axis g6 is used as a one based on which the body of rotation is produced.

Figure 10B:
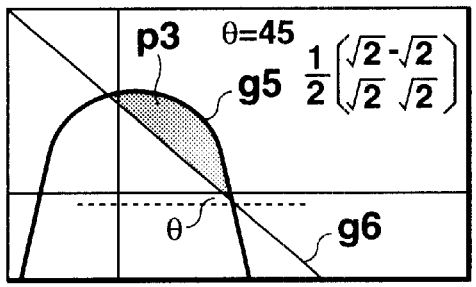
FIG. 10B shows an angle between the rotational axis and horizontal coordinate axis, and a rotary matrix.

Then, the CPU 2 calculates an angle θ between the x-axis and the rotational axis, calculates a rotary matrix for the angle θ, displays "θ" at a position near the intersection within the angle, its θ value, and the calculated rotary matrix, as shown in FIG. 10B.

Figure 10C:
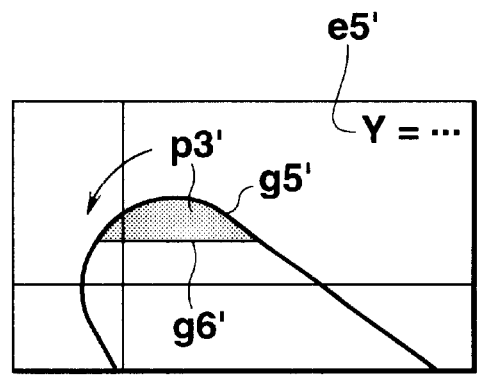
FIG. 10C shows a rotated graph and a rotated rotational axis'.

When a settle instruction is given at the input unit 3, the CPU 2 linearly transforms the functional expression graph g5 and the rotational axis graph g6 to respective second functional expression and rotational axis graphs e5' and e6' based on the calculated rotary matrix, and displays them on the display unit 6, as shown in FIG. 10C. The CPU 2 also displays a figure P3' surrounded by the second or transformed functional expression graph g5" and rotational axis graph g6" in a color or display pattern different from that of the remainder of the picture, and also displays the second functional expression e5'.

Figure 10D:
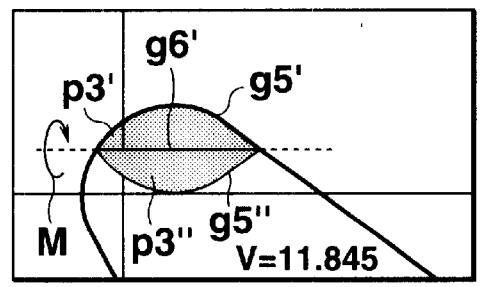
FIG. 10D shows one example of a body of rotation and its volume.

Then, when the settle key is further depressed at the input unit 3, the CPU 2 produces data indicative of a figure P3" symmetrical to the figure P3" about the rotational axis g6', and displays the transformed figure P3' and the symmetrical figure P3" in a color or display pattern different from that of the remainder of the picture, and also displays the rotational axis g6' with a rotation mark M, as shown in FIG. 10D.

The CPU 2 then performs the calculating process of FIG. 6 to calculate the volume of a body of rotation, and displays the calculated volume V on the display unit 6. That is, the CPU 2 substitutes each of x-coordinates of points spaced at intervals of a slicing width on the linearly transformed rotational axis in a range between a lower limit value and an upper limit value produced into the linearly transformed functional expression to calculate the distance between the transformed rotational axis and the transformed functional expression, calculates the value of a product of an area of a circle having a radius equal to the distance and the slicing width, and sequentially adds the values of those products, thus obtained, to calculate the volume of the body of rotation.

As described above, in the second embodiment, it is possible to linearly transform a function based on a predetermined rotary matrix, and then to sequentially display the steps of producing graphs and functional expressions for calculating the volume of the body of rotation. Thus, the user can promote his or her learning while visually recognizing a process for linear transformation and a process for producing the body of rotation to thereby increase the understanding of the learning.

Third Embodiment

In calculating the volume of a body of rotation, it is possible to display a volume of rotation produced when a graph expressed by functional expression data is rotated around a predetermined rotational axis as well as volumes of rotations produced when drawn triangle, square and other figures which are not expressed by functional expressions are rotated around any rotational axis, and to calculate their volumes.

In the third embodiment, a volume calculating apparatus 1 will be next described which calculates a volume of a body of rotation produced when any figure input to a tablet 4 of FIG. 1 is rotated around a rotational axis input to the tablet 4, and which displays the body of rotation three-dimensionally.

In the third embodiment, the CPU 2 gets coordinates of a handwritten figure input to the tablet 4 detected by the position detector 5, and stores them as figure data in the work area of the RAM 8. Similarly, the CPU 2 gets coordinates of a straight line input as a rotational axis to the tablet 4 and stores them as rotational data in the work area of the RAM 8. When a reference value of a scale for the figure or the length of a side of the figure is specified, the CPU 2 calculates the lengths of the respective sides of the handwritten figure and the distances between the respective points on the figure.

In addition, the CPU 2 calculates for each predetermined slicing width a distance L between each of points spaced at intervals of a slicing width on the rotational axis and a point on a straight line or curved line which composes a part of the figure with the line segment connecting those points being perpendicular to the straight line or curve, calculates an area of a circle ($\pi L^2$) whose radius is equal to L, and then a product of the area of the circle and the value of the slicing width ($\pi L^2 \times$slicing width), sequentially adds the values of the products, thus obtained, at the respective points to calculate a volume of a body of rotation produced when the drawn figure is rotated around the rotational axis, displays the body of rotation on the display unit 6 three-dimensionally, and also displays the calculated volume of the body of rotation.

Figure 11:
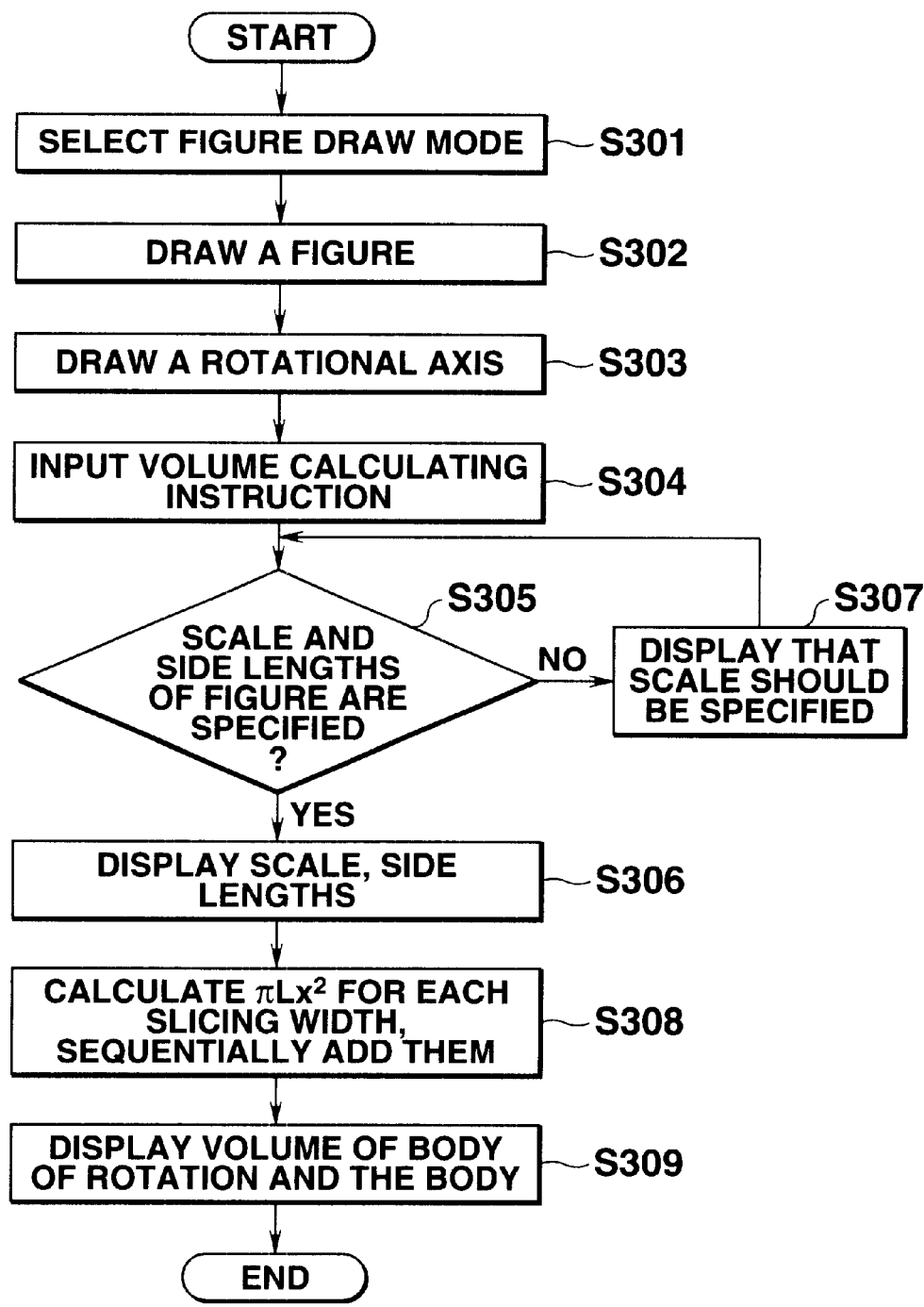
FIG. 11 is a flowchart of a process performed by the volume calculating apparatus in a third embodiment.

Operation of the third embodiment will be described next. FIG. 11 is a flowchart of a process, performed by the volume calculating apparatus 1, for including calculation and display of a body of rotation produced when a drawn figure is rotated around a drawn rotational axis, and further displaying the body; of rotation three-dimensionally.

When a figure draw mode is selected from among a displayed menu by manipulating keys of the input unit 3, the volume calculating apparatus 1 reads a predetermined program from the ROM 9, and displays a figure draw picture on the display unit 6 integral with the tablet 4 (step S301). When a figure is input to the tablet 4 (step S302), the position detector 5 detects the coordinates of each of points on the input figure, outputs the coordinates as figure data to the CPU 2, which then stores the figure data in the work area of the RAM 8. Likewise, the CPU 2 gets coordinates of a straight line input as a rotational axis to the tablet 4, and stores them as rotational axis data in the work area of the RAM 8 (step S303).

Then, when a volume calculation execution instruction is input at the input unit 3 or tablet 4 (step S304), the CPU 2 determines whether reference value of a scale for the figure or the lengths of the respective sides of the figure are specified (step S305). If so (step S305; Yes), the CPU 2 then displays the specified scale and side lengths on the display unit 6 where the figure is already displayed (FIG. 12B) (step S306). If no scale or side lengths are specified (step S305; No), the CPU 2 displays on the display unit 6 that the scale and the side lengths should be specified (step S307).

Then, the CPU 2 calculates from the figure and rotational axis data stored in the work area of the RAM 8 on the basis of the specified scale for each predetermined slicing width a distance L between each of points spaced at intervals of the slicing width on the rotational axis and a point on a straight line or curved line which composes a part of the figure with the line segment connecting both the points being perpendicular to the straight line or curve, calculates an area of a circle ($\pi L^2$) whose radius is equal to L, obtains a product of the area of a circle and the slicing width, sequentially adds the values of the products, thus obtained at the respective points, to obtain a volume of a body of rotation produced when the drawn figure is rotated around the rotational axis, displays the body of rotation on the display unit 6 three-dimensionally, and also displays the calculated volume of the body of rotation (step S308). When a space is produced within the body of rotation, the volume of the body of rotation is calculated by subtracting the area of a circle having a radius equal to half of the inner diameter of the body of rotation from an area of a circle having a radius equal to half of the outer diameter of the body of rotation, multiplying the resulting value by the slicing width, and sequentially adding the products, thus obtained.

Then, the CPU 2 displays the calculated volume of the body of rotation, produces three-dimensional display data of the body of rotation, outputs this data to the display driver 7, and causes the display driver 7 to display the body of rotation on the display unit 6 three-dimensionally (step S309).

Figure 12C:
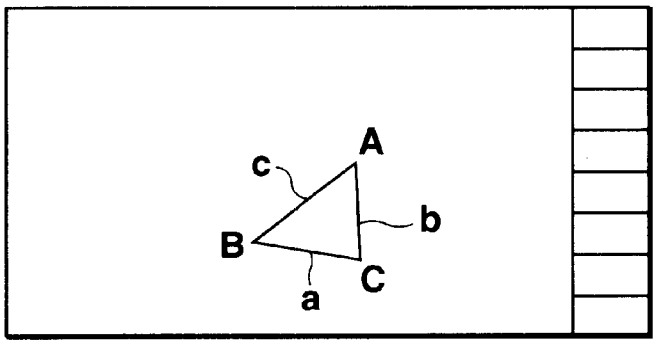
FIG. 12C illustrates a body of rotation and its volume.
Figure 12C:
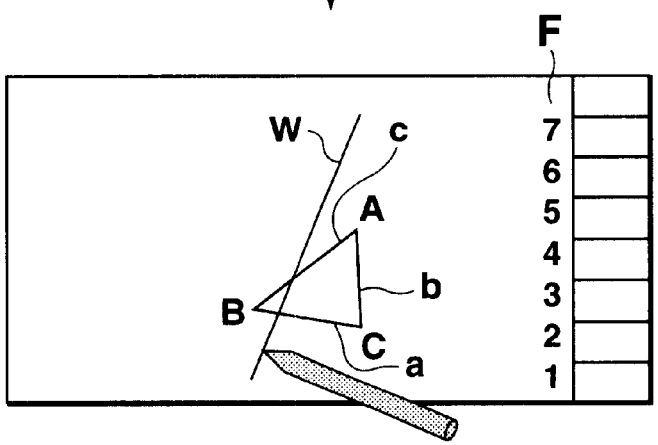
Figure 12C:
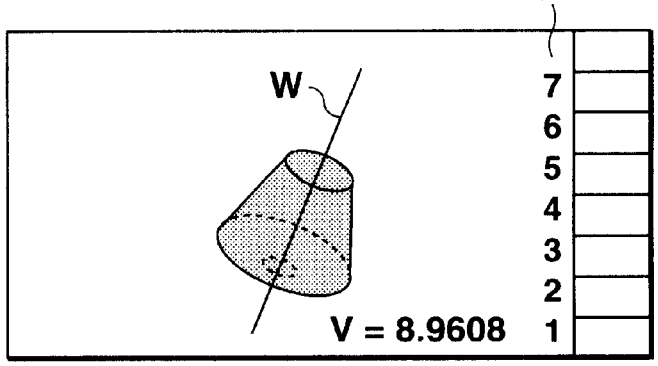

FIG. 12 illustrates an example of displaying on the display unit 6 a body of rotation and its volume produced when (1) a figure draw mode of the volume calculating apparatus 1 is selected, (2) a triangular figure is input on the figure draw picture, and (3) the triangular figure is rotated around the input rotational axis.

When the figure draw mode is selected from among the menus by manipulating keys at the input unit 3, a figure draw picture of FIG. 12A is displayed on the display unit 6 integral with the tablet 4. When a figure, for example, of a triangle ABC composed of sides a, b and c is input to the tablet 4 and a rotational axis W is input as shown in FIG. 12B, the position detector 5 detects the respective coordinates of the triangle and rotational axis W and outputs those coordinates as figure data and rotational axis data to the CPU 2, which then stores the received figure data in the work area of the RAM 8. Then, when a volume calculation execution instruction is input at the input unit 3 or tablet 4 and reference values of the scale for the figure or the respective side lengths of the figure are specified, the CPU 2 displays the specified scale F on the display unit 6.

The CPU 2 then calculates distances La, Lb and Lc each between a corresponding one of points spaced at interval of the slicing width on the rotational axis and a corresponding one of sides a, b and c, of the figure, where the line sections representing the respective distances La, Lb and Lc are perpendicular to the corresponding sides a, b and c, on the basis of the specified scale F from the figure data and rotational axis data stored in the work area of the RAM 8, calculates the area of a circle having a radius equal to the maximum one of the La, Lb and Lc which is half of an outer radius of a body of rotation to be formed, and an area of a circle having a radius equal to a non-zero minimum one of the La, Lb and Lc which is an inner radius of a space to be formed within the body of rotation, subtracts the latter area from the former area, multiplies the result of the subtraction by a value of the slicing width, sequentially adds the results of the calculations, thus obtained, at the respective points to calculate the body of rotation produced when the figure is rotated around the rotational axis, and displays the produced body of rotation three-dimensionally and the calculated volume of the body of rotation on the display unit 6, as shown in FIG. 12C.

As described above, in the third embodiment, the CPU 2 calculates the volume of the body of rotation produced when the drawn figure is rotated around its rotational axis, and displays the body of rotation and its volume.

Thus, even a volume of a body of rotation of a figure whose functional expression is not given can be known to increase the utility of the volume calculating apparatus 1.

Fourth Embodiment

A volume of a body of rotation produced when a graph expressed by functional expression data or a drawn figure is rotated around the rotational axis as described in the first-third embodiments can be calculated in the manner described in the above calculating process as well as in analysis of a function which represents a cross-sectional area of the figure.

In the fourth embodiment, the volume calculating apparatus 1 calculates the value of a cross-sectional area for each predetermined slicing width from a functional expression, which represents the cross-sectional area input at the input unit 3, in a range in which the functional expression is applicable, multiplies the value of the cross-sectional area by the value of the slicing width, sequentially adds the resulting values to obtain the volume of the resulting solid body. By this method, the volume of a body of rotation as well as any solid body can be calculated by inputting a function which represents its cross-sectional area and a range in which the function is applicable.

Any three-dimensional body is drawn on the tablet 4, the area of a cross section of the solid body obtained when the solid body is cut with a plane at any angle to the solid body is calculated for each slicing width, the respective calculated cross-sectional areas are analyzed to obtain the functional expressions which represent the cross-sectional areas, and then the volume of the three-dimensional body is calculated.

Referring to FIGS. 13–16, the volume calculating apparatus 1 in the fourth embodiment will be described next.

In the fourth embodiment, when functional expression data representing a cross-sectional area and data indicative of a range in which the functional expression is applicable are input at the input unit 3, the CPU 2 stores those data in the work area of the RAM 8.

Figure 13:
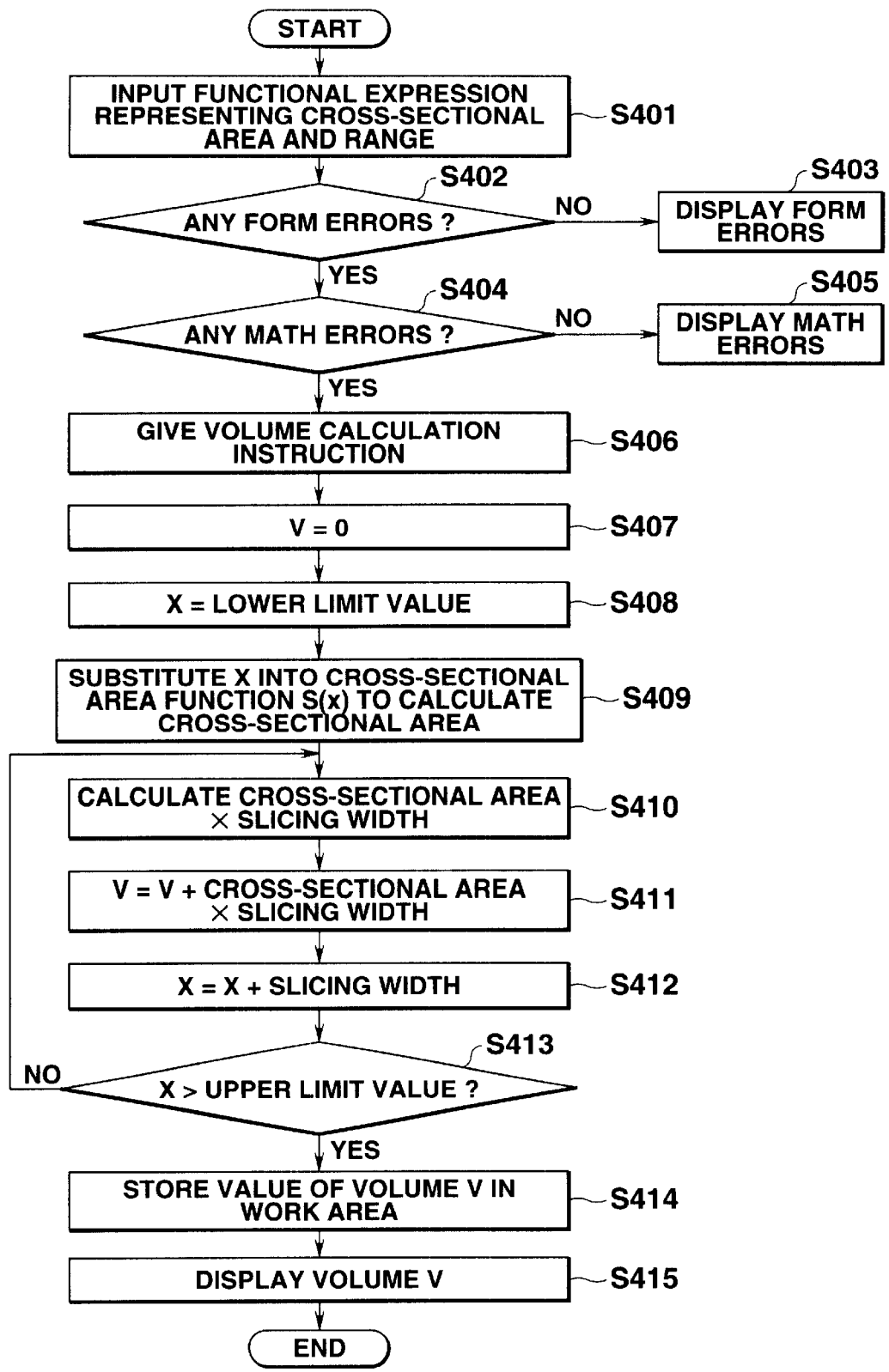
FIG. 13 is a flowchart of a process for calculating a volume of a solid body from a functional expression representing a cross-sectional area performed by the volume calculating apparatus in a fourth embodiment.

The CPU 2 then calculates a cross-sectional area for each slicing width from the functional expression data, representing the cross-sectional area, in the range where the functional expression is applicable. More particularly, the CPU 2 substitutes into the functional expression each of values of points spaced at intervals of the slicing width in the range where the functional expression is applicable to calculate a cross-sectional area for that substituted value, multiplies the value of the cross-sectional area by the value of the predetermined interval, sequentially adds those results of the multiplications thus obtained to calculate a volume of the solid body, and displays it on the display unit 6 (FIGS. 13 and 14).

Figure 15:
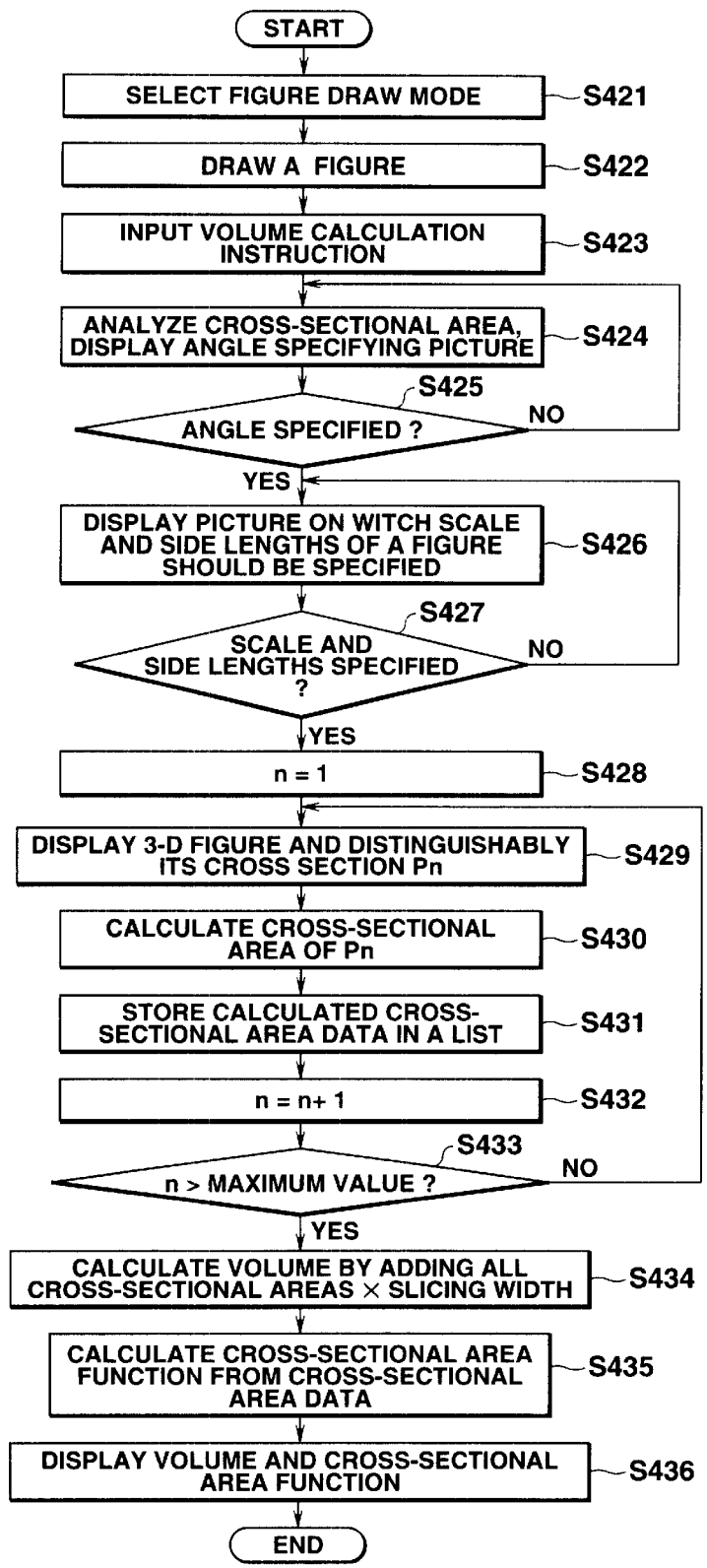
FIG. 15 is a flowchart of a process performed by the volume calculating apparatus in the fourth embodiment.

In the figure draw mode, the CPU 2 displays on the display unit 6 a three-dimensional figure input at the tablet 4. When an angle of a cross section and a scale are specified, the CPU 2 calculates an area of a-cross section obtained when the solid body is cut at the specified angle for each slicing width on the specified scale, and stores the cross-sectional area data in a list set in the work area of the RAM 8. The CPU 2 then analyzes this stored cross-sectional area data to obtain functional expressions each representing a respective cross-sectional area, adds all values each representing a product of a respective cross-sectional area and the slicing width to obtain a volume of the solid body, displays on the display unit 6 the functional expression representing the cross-sectional area and the volume of the solid body (FIGS. 15 and 16).

Operation of the volume calculating apparatus 1 of this embodiment will be described next. FIG. 13 is a flowchart of a solid body volume calculating process in which a cross-sectional area is obtained for each predetermined slicing width from the functional expression in a range in which the functional expression which represents the cross-sectional area is applicable, multiplies the value of the cross-sectional area by the value of the slicing width, and sequentially adds the results of the calculations thus obtained to obtain the volume of the solid body.

Figures 14A, 14B:
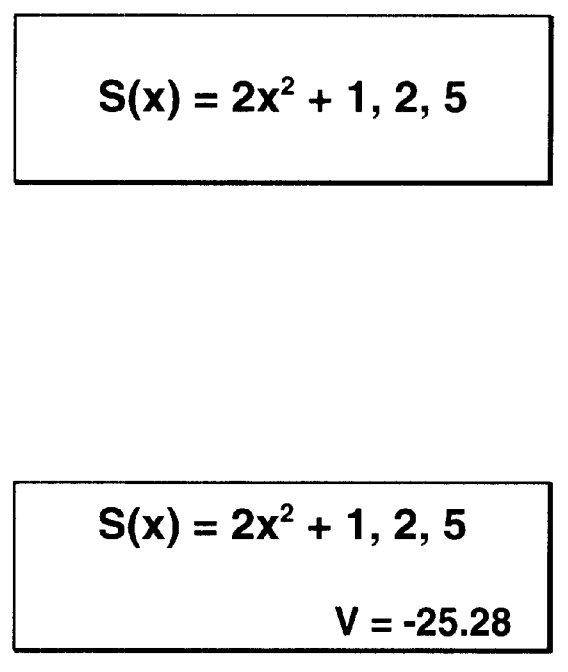

When a cross-sectional area function operating menu is selected by key manipulation at the input unit 3, the CPU 2 reads a predetermined program from the ROM 9, and then displays via the display driver 7 on the display unit 6 a cross-sectional area functional expression input picture to which functional expression data for the cross-sectional area and data indicative of the range where the functional expression is applicable are input (FIG. 14A).

Then, when the cross-sectional area functional expression data and range data are input (step S401), the CPU 2 determines whether there are any errors involved in the forms of the cross-sectional area functional expression data, and the range data (step S402). If so (step S402; Yes), the CPU 2 displays on the display unit 6 that there are errors involved in the forms (step S403). If not (step S402; No), the CPU analyzes the input functional expression data for the cross-sectional area to determine whether there are mathematical errors involved in the functional data for the cross-sectional area (step S404). If so (step S404; Yes), the CPU 2 displays on the display unit 6 that there are mathematical errors (step S405). If not (step S404; No), the CPU 2 performs a process for calculating the volume of the solid body from the cross-sectional area functional expression in accordance with a volume calculation execution instruction input at the input unit 3 (step S406).

First, the CPU 2 sets 0 as an initial value in a volume V (V=0) (step S407), sets a lower limit of the range in x to be substituted into a cross-sectional area functional expression S(x) (x=lower limit value) (step S408), substitutes the value of the set x into the input cross-sectional area functional expression S(x) to calculate a corresponding cross-sectional area (step S409), multiplies the cross-sectional area by the value of the predetermined slicing width (step S410), and adds the resulting value to a volume V obtained so far (V=V+cross-sectional area×slicing width) (step S411). The CPU 2 then adds the x and the value of the slicing width (x=x+slicing width) (step S412), and determines whether the x to be substituted has exceeded the upper limit value of the range. If not (step S413; No), the CPU 2 sequentially repeats the steps S409–413 to calculate a cross-sectional area for each slicing width from the cross-sectional area functional expression, multiplies the cross-sectional area by the slicing width value, and adds the resulting value to the volume V, thus obtained so far, to obtain a resulting volume V.

Then, when the substituted value has exceeded the upper limit value of the range (step S413; Yes), the CPU 2 stores the value of the volume V in the work memory of the RAM 8 (step S414) and displays the volume V on the display unit 6 (step S415).

FIG. 14A illustrates the cross-sectional functional expression input picture used for calculating the volume of the solid body from the cross-sectional area functional expression. FIG. 14B illustrates the calculated volume V displayed on the display unit 6.

As shown in FIG. 14A, the CPU 2 displays the cross-sectional area functional expression input picture on which the functional expression indicative of the cross-sectional area displayed as "S(x)=" and a range in which the functional expression is applicable are input. For example, the cross-sectional area functional expression is input as $S(x)=2x^2+1$, and then, $2 \leq x \leq 5$ which implies an range where x is changeable is input as a form "2, 5".

Then, the CPU 2 tries to detect possible format errors and mathematical errors involved in the input cross-sectional area functional expression. If there are no such errors detected, the CPU 2 performs the process for calculating the volume of the solid body from the input functional expression representing the cross-sectional area, in accordance with an execution input at the input unit 3. That is, the CPU 2 calculates a cross-sectional area for each slicing width in the input range, multiplies the cross-sectional area by the value of the slicing width, sequentially adds the resulting values, thus obtained, to calculate the volume of the solid body, V, and displays it on the display unit 6, as shown in FIG. 14B.

The process for calculating the volume of the solid body from its cross-sectional areas, as described above can be applied to a drawn solid body. A process for calculating the volume of the drawn solid body by analyzing its cross-sectional area will be described below.

FIG. 15 is a flowchart of a solid body volume calculating process in which when a solid body is drawn, a cross-sectional area of the drawn solid body is calculated for each slicing width; a functional expression representing the cross-sectional area is deduced; and the volume of the drawn solid body is displayed.

When the figure draw mode is selected from among a menu by key manipulation at the input unit 3, the CPU 2 reads out a predetermined program from the ROM 9, and displays the figure draw picture on the display unit 6 integral with the tablet 4 (step S421). When a three-dimensional figure is input to the tablet 4 (step S422), the position detector 5 detects three-dimensional coordinates of each of points on the three-dimensional figure and outputs it as figure data to the CPU 2, which then stores this data in the work area of the RAM 8.

Then, when a volume calculation execution instruction is input at the input unit 3 or tablet 4 (step S423), first, the CPU 2 displays an angle specifying picture on which an angle of a plane along which the solid body is to be cut is specified (step S424), and then determines whether the angle is specified (step S425). If not (step 425; No), the CPU 2 waits for input of the specified angle. If the angle is specified (step S425; Yes), the CPU 2 displays a picture on which a reference value for a scale of a three-dimensional figure or the lengths of sides of the solid figure are specified (step S426), and then determines whether the reference value of the scale for the solid figure or the lengths of sides of the solid figure are specified (step S427). If not (step S427; No), the CPU 2 waits for input of those data. If so (step S427; Yes), the CPU 2 applies a specified color to a cross section Pn of the solid figure obtained when the solid figure is cut along a plane at the specified angle to the solid figure for each slicing width or changes the display pattern of the cross-section, displays the cross-section Pn or its changed pattern along with the solid figure (FIG. 16D), and calculates the cross-sectional area.

More particularly, the CPU 2 cuts the solid figure at predetermined slicing widths at the specified angle to the solid figure to produce cross sections P1, P2, . . . Pn. The CPU 2 then sets n=1 (step S428), displays the solid figure and distinguishably the cross section P1 (step S429), calculates the area of the cross section P1 based on the coordinates of the figure stored in the work area of the RAM 8 (step S430), and then stores data on the calculated cross-sectional area in the list set in the RAM 8 (step S431). Then, the CPU 2 increments n (=n+1) (step S432), determines whether the analysis of a cross section between one end point and the other end point of the solid figure has been completed or whether n is larger than a maximum value (step S433). If not (step S433; No), the CPU 2 sequentially repeats the processing at steps S428–S432 (which display the solid figure along with its cross section, calculate its cross-sectional area, and store its data in the list).

Then, when n is larger than the maximum value (step S433; Yes), the CPU 2 multiplies by the slicing width each of the cross-sectional area data stored in the list, and then adds all those data obtained so far to calculate the volume of the solid body (step S434) Further, the CPU 2 analyzes the cross-sectional area data stored in the list to obtain a functional expression indicative of the cross-sectional area of the solid body (step S435), and then displays the calculated volume and the cross-sectional area functional expression on the display unit (step S436).

When a functional expression of a cross-sectional area of a solid body, for example, shown in FIG. 16A and its volume are to be calculated, and the solid figure is drawn, the CPU 2 displays the drawn solid figure on the display 6 integral with the tablet 4, and also displays a picture on which the specified slicing width and scale for the solid figure are to be input, as shown in FIG. 16B. When the slicing width and the scale are input, the CPU 2 displays the input slicing width and scale. Furthermore, when an appropriate pointer such as is shown, for example in FIG. 16C, is input to the picture on which the solid body is displayed to input an angle at which the solid body is cut, the CPU 2 produces cross sections P1–Pn at the input angle, displays each of the cross sections of the solid body in a color or display pattern different from the remainder of the solid body, calculates and displays the cross-sectional area based on the solid figure data, and then stores data on the respective areas of the cross sections P1–Pn in the list set in the RAM 8, as shown in FIG. 16E. Then, the CPU 2 analyzes the cross-sectional area data to calculate a function representing the cross-sectional area, calculates the sum of the products of cross-sectional areas and the slicing width value to calculate the volume of the solid figure, and then displays the calculated functional expression representing the cross-sectional area and the volume of the solid figure, as shown in FIG. 16F.

As described above of the fourth embodiment, when the cross-sectional area of a solid body is given by a functional expression, the volume calculating apparatus 1 can calculate the volume of the body of rotation as well as those of any other solid bodies.

Further, by calculating the cross-sectional area of any drawn solid body figure, the volume calculating apparatus 1 is capable of calculating the volume of the solid body as well as a functional expression representing the cross-sectional area of the solid body.

Thus, the volume of any solid body excluding the body of rotation can be calculated easily. In the learning of calculation of the volume of the solid body, the volume of the solid body can be calculated by integrating a function indicative of the cross-sectional area of the solid body. When the functional expression of the cross-sectional area is beforehand known, the functional expression data can be input to calculate the volume of the solid body easily. Cross-sectional areas of any drawn solid body can be calculated to thereby obtain its volume. Thus, when no functional expression representing the cross-sectional area is given, the volume of the solid body can be calculated. Thus, utility of this apparatus is increased. Since a functional expression representing a cross-sectional area of any drawn solid body can be calculated and displayed, the shape of the solid body can be easily understood mathematically.

Fifth Embodiment

Objects whose volumes are to be calculated are not limited to bodies of rotation produced from functional expression data and from drawn figures, solid bodies whose cross-sectional areas are indicated by corresponding known functions, and three-dimensionally displayed solid bodies. For example, objects representing the actual body of rotation shapes may be ones whose volumes are to be calculated.

Figure 17:
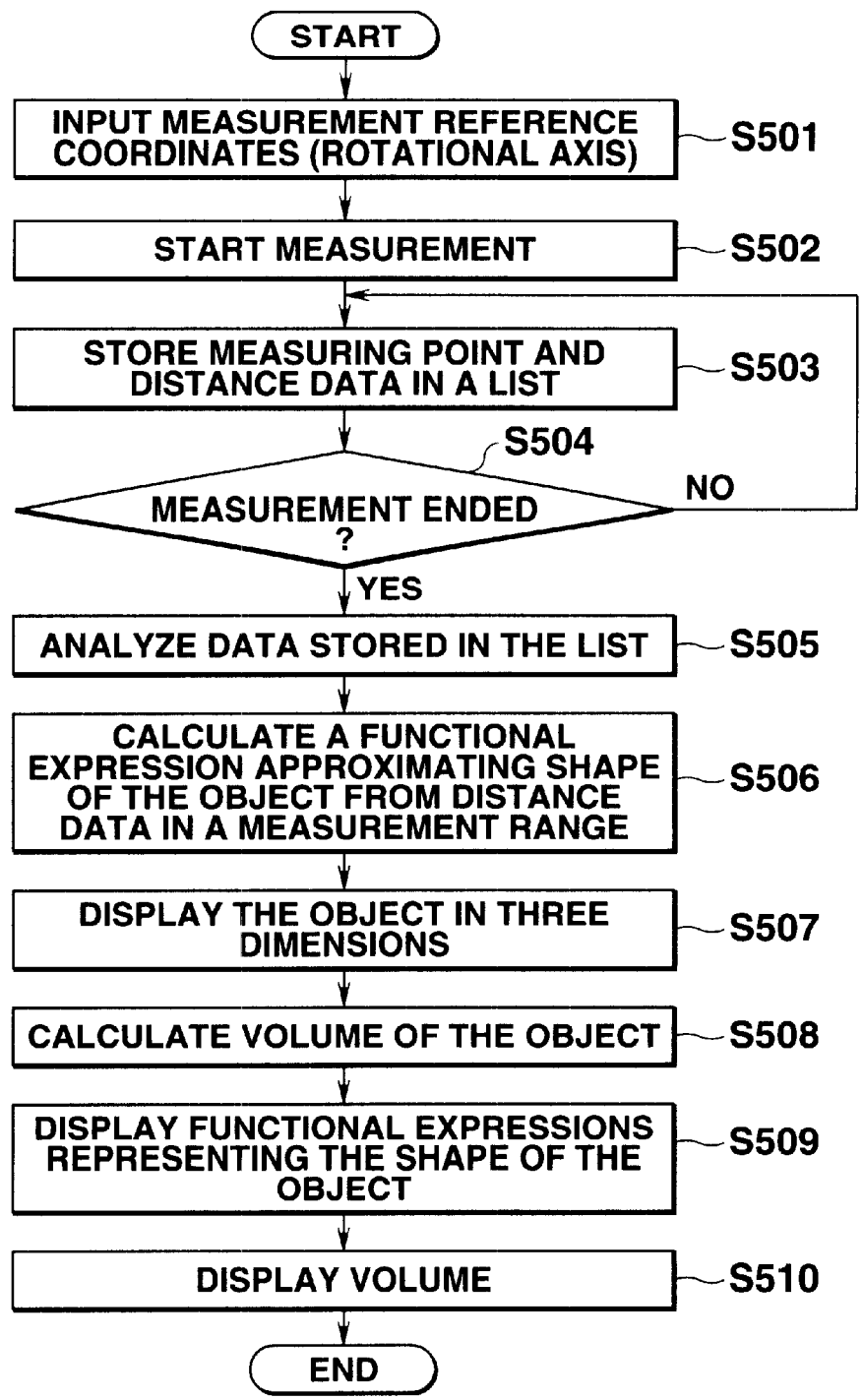
FIG. 17 is a flowchart of a volume calculating process which includes measuring a shape of an object, and calculating and displaying the volume of the object, which is performed by the volume calculating apparatus in a fifth embodiment.

Referring to FIGS. 17 and 18, a fifth embodiment of the volume calculating apparatus 1 will be described next.

The volume calculating apparatus of this embodiment includes a combination of the volume calculating apparatus 1 of FIG. 1 and a measuring device 13 which measures the shape of an object and hence the distance between the measuring device 13 and the object (FIG. 18A).

The measuring device 13 includes a distance sensor, a temperature sensor or an image pickup unit. The measuring device 13 picks up an image of the object to get data on the distance between the measuring device 13 and the object, and output this data to the CPU 2. More particularly, the measuring device 13 sequentially passes to respective points along a straight line parallel to a rotational axis of the object and spaced by a predetermined distance from the rotational axis to measure the distance between the measuring device 13 and the object at the respective points to thereby measure the shape of the object based on the distance data at the respective points.

The measuring device 13 measures the shape of an actual object, for example, such as a jar 20 shown in FIG. 18A produced when a flat figure is rotated around its rotational axis, in a direction perpendicular to the rotational axis of the object 20. The CPU 2 analyzes the gotten distance data to express the shape of the object in a functional expression, and then calculates the volume of a body of rotation produced when the functional expression is rotated around a straight-line rotational axis of the object. The CPU 2 further displays a functional expression indicative of the shape of the object, and the calculated volume.

Operation of the volume calculating apparatus of this embodiment will be described next. FIG. 17 is a flowchart of a volume calculating process which includes measuring the shape of an object, producing a functional expression indicative of the shape of the object, and then calculating and displaying a volume of a body of rotation produced when a graph of the calculated functional expression is rotated around the rotational axis.

First, the distance between the rotational axis of the object and the measuring device 13 is set in the volume calculating apparatus (step S501). The measuring device 13 is then set at a point on the straight line parallel to the rotational axis of the body and then starts its measurement (S502).

Then, the measuring device 13 measures the distance between the position where the measuring device 13 is set and the object (step S502), calculates a radius of a cross-sectional area of the object based on the measured distance, and then outputs the radius data as distance data at the point to the CPU 2. Getting the distance data, the CPU 2 stores the measuring point data indicative of the position of the measuring point and the distance data in the list set in the RAM 8 (step S503). The CPU 2 then moves the measuring device 13 by the slicing width parallel to the rotational axis of the object to the next point, where the measuring device measures the distance to the object similarly, and then stores the measuring point data and the distance data in the list.

When the CPU 2 thus obtains a radius of each of the cross-sectional areas of the object and then terminates the measuring process (step S504; Yes), the CPU 2 analyzes the data stored in the list (step S505), and calculates a functional expression approximating closely to the shape of the object based on the distance data in the measuring range (step S506) In addition, the CPU 2 produces data for displaying the shape of the object based on the distance and measuring point data stored in the list, and displays the displaying data three-dimensionally on the display unit 6 (step S507).

The CPU 2 calculates the volume of the object by assuming as the measured object a body of rotation produced when a figure surrounded by a rotational axis set in the measuring device 13, a graph of the calculated functional expression, and lines indicative of the range in which the object was measured is rotated around the rotational axis (step S508).

More particularly, as in the calculating process of FIG. 6, the CPU 2 sets a value V indicative of the volume at zero, substitutes a lower limit value of the range (corresponding to a minimum value of the measuring point data) into x, and calculates the distance L between a point on the rotational axis indicated by the substituted value in x and the graph of the functional expression. Then, the CPU 2 calculates the area of a circle ($\pi L^2$) having a radius equal to the distance L, and also the value of a product of a predetermined slicing width and the area of the circle ($\pi L^2 \times$slicing width). Then, the CPU 2 adds $\pi L^2 \times$slicing width to the volume V (V=V+$\pi L^2 \times$slicing width), and adds the value of the slicing width to the substituted value in x (x=x+slicing width). The CPU 2 then determines whether the substituted value in x is larger than an upper limit value of the range (corresponding to a maximum value of the measuring point data). If not, the CPU 2 repeatedly calculates the distance L, $\pi L^2 \times$slicing width, V=V+$\pi L^2 \times$slicing width, and x=x+slicing width, etc. When the substituted value in x then exceeds the upper limit value, the CPU 2 stores the value of the volume V at that time in the work memory Qf the RAM 8.

Calculating the volume of the object, as described above, the CPU 2 displays on the display unit 6 a functional expression representing the object having the calculated volume, and the calculated volume (steps S509, S510).

FIG. 18A shows the volume calculating apparatus 1 connected to the measuring device 13 in the fifth embodiment. As shown in FIG. 18A, when the volume calculating apparatus 1 with the measuring device 13 measures distance data indicative of radii of cross-sectional areas of the object 20 (present outside the volume calculating apparatus 1 with the measuring device 13) for respective slicing widths at corresponding points on the rotational axis, the CPU 2 of the volume calculating apparatus 1 gets the distance data along the respective points on the rotational axis, and stores the data in the list of the RAM 8, as shown in FIG. 18B. When the measurement ends, the CPU 2 analyzes the distance data to obtain a functional expression representing the shape of the object, and also produces data indicative of the shape of the object based on the functional expression, and outputs this data to the display unit 6, which then displays the corresponding object, as shown in FIG. 18C. Then, as shown in FIG. 18D, the CPU 2 displays the functional expression indicative of the shape of the object, calculates the volume of the object, and displays the calculated volume V on the display unit 6.

In summary, the measuring device measures the distances between the respective points on the side of the object and the rotational shaft in the given range. The CPU 2 calculates functional expression representing a curve or a straight line which constitutes the side (outline) of the object based on the measured distance data, calculates and displays a volume of a body of rotation produced when a figure represented by the functional expression is rotated around the rotational axis in the given range, and displays the body of rotation on the display unit 6 three-dimensionally.

Thus, the volume of an actual object can be obtained easily with the aid of the measuring device 13. In addition, a functional expression indicative of a shape of the object can be obtained and displayed, and hence the user can easily recognize the relationship between the shape of the object, the functional expression indicative of the shape of the object, and the volume of the object.

As will be obvious from the above description, the volume calculating apparatus according to the present invention (corresponding to the claims attached hereto) have the following compositions and features. Reference numerals used in the accompanying drawings are given to the respective elements of the volume measuring apparatus for identifying purposes.

(1) A volume calculating apparatus comprises: display means (6 of FIG. 1) for displaying a figure and a volume of a body of rotation; input means for inputting functional expression data (3 of FIG. 1; S101 of FIG. 2); figure display control means (2 of FIG. 1; S106 of FIG. 2) for displaying on the display unit a figure expressed by the functional expression data input by said functional expression data inputting means; range specifying means (3 of FIG. 1; Sill of FIG. 2) for specifying a range of the figure; calculating means (2 of FIG. 1; S114 of FIG. 2; S131–S138 of FIG. 6) for calculating a volume of a body of rotation produced when the figure is rotated around a predetermined rotational axis in the range specified by said range specifying means; and volume display control means (2 of FIG. 1; S115 of FIG. 2) for displaying the volume of the body of rotation calculated by the calculating means.

According to the volume calculating apparatus, the figure expressed by the functional expression data which was input by the functional expression data input means is displayed on the display means, the volume of the body of rotation produced when the figure is rotated around the predetermined rotational axis in the range specified by the range specifying means is calculated, and the calculated volume of the body of rotation is displayed on the display means.

Thus, the volume of the body of rotation produced when the graph expressed by the input functional expression is rotated around the rotational axis can be easily calculated based on the input functional expression and rotational axis.

(2) In the volume calculating apparatus, the rotational axis may be a coordinate axis.

Calculation of the volume of the body of rotation, using one of coordinate axes as the rotational axis, is performed often in an initial learning about calculation of the volume of the body of rotation performed in a scene of general education. Thus, learning about calculating the volume of the body of rotation can be smoothly introduced because the rotational axis may be a coordinate axis.

(3) The volume calculating apparatus may further comprise straight line input means (3 of FIG. 1; S101 of FIG. 2) for inputting functional expression data indicative of a straight line; and the rotational axis may comprise a straight line indicative of the functional expression data input by the straight line input means.

According to the volume calculating apparatus the rotational axis can be specifies as any straight line. The volume of the body of rotation can be calculated by changing the rotational axis easily even in a relatively advanced learning about calculating the volume of the body of rotation to thereby increase the utility of the volume calculating apparatus.

(4) In the volume calculating apparatus, the figure display control means may display the figure on the display means, and also display the body of rotation on the display means two-dimensionally (S113 of FIG. 2, S121–S123 of FIG. 5).

According to the volume calculating apparatus, the body of rotation may be displayed two-dimensionally, and hence can be easily recognized visually.

(5) In the volume calculating apparatus, the figure control display means may display the figure on the display means and three-dimensionally the body of rotation on the display means (S113 of FIG. 2).

According to the volume calculating apparatus, since the body of rotation is expressed three-dimensionally, the shape of the body of rotation can be expressed actually and easily recognized. in addition to the effects of the invention of claim 1.

(6) The volume calculating apparatus may further comprise rotation display control means (2 of FIG. 1; S113 of FIG. 2) for displaying on the display means a change with time in the figure when the figure is rotated around the rotational axis in a predetermined direction.

According to the volume calculating apparatus, the process for producing the body of rotation may be displayed with time. Thus, the image that the body of rotation is produced as a result of rotation of the flat figure around the rotational axis is easily understood. In addition, what solid figure is produced based on what plane can be displayed by a simple operation. Thus, this apparatus aids the learner in the whole learning of the body of rotation.

(7) In the volume calculating apparatus, the figure display control means or the rotation display control means may display the rotational axis distinguishably or display the body of rotation in a color or display pattern different from the remainder of the figure (S122, S123 of FIG. 5).

According to the volume calculating apparatus, the body of rotation and its rotational axis is displayed more clearly. For example, when a plurality of graphs are displayed, the user can easily recognize by which straight lines or curves the body of rotation is constituted or which straight line is used as the rotational axis.

(8) The volume calculating apparatus may further comprise angle analysis means (2 of FIG. 1; S204 of FIG. 9) for calculating an angle between the rotational axis and a coordinate axis; rotary matrix producing means (2 of FIG. 1; S205 of FIG. 9) for producing a rotary matrix for the angle calculated by the angle analysis means; linearly transforming means (2 of FIG. 1; S208 of FIG. 9) for linearly transforming the functional expression data, the rotational axis and straight lines indicative of the range to second functional expression data, second rotational axis, and lines indicative of a second range on the basis of the rotary matrix produced by the rotary matrix producing means; transformed expression display control means (2 of FIG. 1; S209 of FIG. 9) for displaying on the display means the rotary matrix produced by the rotary matrix producing means and the second functional expression data, wherein the calculating means calculates a second volume of the body of rotation produced when a figure expressed by the second functional expression data is rotated around the second rotational axis in the second range (2 of FIG. 1; S212 of FIG. 9); wherein the figure display control means displays on the display means the earlier-mentioned figure and the figure displayed by the second functional expression data (2 of FIG. 1; S208 of FIG. 9) and also displays the second body of rotation on the display means (2 of FIG. 1; S211 of FIG. 9).

According to the volume calculating apparatus of claim 8, in the learning about calculating of the volume of the body of rotation, a technique for linearly transforming the rotational axis so as to be parallel to one of the coordinate axes, and calculating the volume of rotation for the figure is learned. The respective steps (angle calculation, rotary matrix calculation, linear transformation, production of the body of rotation, calculation its volume) of a process for calculating a volume of the body of rotation are sequentially displayed and confirmed to advance the learning calculation of the volume of the body of rotation. This method is helpful in supporting further advanced learning of calculating the volume of the body of rotation, in addition to the advantageous effects of the invention of claim 1.

(9) A volume calculating apparatus comprises: display means (6 of FIG. 1) on which a figure and a volume of a body of rotation are displayed; functional expression data input means (3 of FIG. 1; S101 of FIG. 2) for inputting functional expression data; figure display control means (2 of FIG. 1; S106 of FIG. 2) for displaying on the display means a figure represented by the functional expression data input by the functional expression data input means; intersection calculating means (2 of FIG. 1; S108 of FIG. 2) for calculating coordinates of intersections of the figure and a predetermined rotational axis; intersection number determining means (2 of FIG. 1; S109 of FIG. 2) for determining the number of intersections calculated by the intersection calculating means; volume calculating means (2 of FIG. 1; S114 of FIG. 2; S131–S138 of FIG. 6) for calculating a volume of a body of rotation produced when the number of intersections is two and a part of the figure present on a desired side of the rotational axis between the two intersections is rotated around the rotational axis; and volume display control means (2 of FIG. 1; S115 of FIG,. 2) for displaying the volume of the body of rotation calculated by the calculating means.

According to the volume calculating apparatus of claim 9, a figure displayed by the functional expression data which is input by the functional expression data input means is displayed on the display means, the intersections between the former figure and the rotational axis are calculated, and the number of intersections calculated is determined. When the number of intersections is two, a volume of a body of rotation produced when a part of the figure present on a desired side of the rotational axis between the two intersections is rotated around the rotational axis is calculated and displayed.

Thus, when the rotational axis and a graph of the functional expression intersect at two points, the volume of the body of rotation is calculated using a section between the two intersections as the range in which the body of rotation is produced even if no data representing the range is input. Thus, the user is not required to input the range data to thereby simplify the user's operation.

(10) A volume calculating apparatus comprises display means (6 of FIG. 1) on which a figure and a volume of a body of rotation are displayed; figure input means (4 of FIG. 1; S302 of FIG. 11) for inputting figure data; straight line data input means (4 of FIG. 1; S303 of FIG. 11) for inputting data on a straight line used as a rotational axis; calculating means (2 of FIG. 1; S308 of FIG. 11) for calculating on a predetermined scale a volume of a body of rotation produced when a figure represented by the figure data input by the figure input means is rotated around the straight line whose data is input by the straight line input means; volume display control means (2 of FIG. 1; S309 of FIG. 11) for displaying on the display means the volume of the body of rotation calculated by the calculating means; and figure display control means (2 of FIG. 1; S309 of FIG. 11) for displaying on the display means the figure input by the figure input means and the body of rotation.

According to the volume calculating apparatus of claim 10, the volume of the body of rotation produced when the figure whose data is input by the figure input means is rotated around the rotational axis which includes the straight line whose data is input by the straight line input means is calculated on the predetermined scale and displayed on the display means along with figure input by the figure input means and the body of rotation.

That is, the volume of the body of rotation produced when any drawn figure is rotated around any straight line can be calculated even if a functional expression representing the figure is not known. Thus, a field of using the volume calculating apparatus and hence the utility of the volume calculating apparatus are increased.

(11) A volume calculating apparatus comprises display means (6 of FIG. 1) on which a solid body and its volume are displayed; cross-sectional area calculating means (2 of FIG. 1; S409 of FIG. 13) for calculating a cross-sectional area of the solid body for each predetermined slicing width; calculating means (2 of FIG. 1; S407–S413 of FIG. 13) for calculating the volume of the solid body by sequentially adding the respective cross-sectional areas calculated by the cross-sectional area calculating means; and volume display control means (2 of FIG. 1; S415 of FIG. 13) for displaying on the display means the volume of the solid body calculated by the calculating means.

According to the volume calculating apparatus, the respective cross-sectional areas of the solid body are calculated for each predetermined slicing widths and sequentially added to calculate the volume of the solid body, which is then displayed on the display means.

Thus, since the volume of the solid body is calculated with a concept of integrating the cross-sectional areas, the volume of any solid body excluding the body of rotation can easily calculated.

(12) The volume calculating apparatus may further comprise functional expression data input means (3 of FIG. 1; S401 of FIG. 13) for inputting functional expression data representing a cross-sectional area of the solid body; and range specifying means (3 of FIG. 1; S401 of FIG. 13) for specifying a range of the cross-sectional area represented by the functional expression data which was input by the functional expression data input means, wherein the cross-sectional area calculating means calculates the cross-sectional area of the solid body for each predetermined slicing width based on the functional expression data input by the functional expression data input means in the range specified by the range specifying means.

According to the volume calculating apparatus, even when calculation of the volume of a solid body by integrating a function indicative of a cross-sectional area is learned, the volume of the solid body can easily calculated by inputting functional expression data representing a given cross-sectional area.

(13) The volume calculating apparatus may further comprise solid body display control means (2 of FIG. 1; S429 of FIG. 15) for displaying the solid body three-dimensionally on the display means; and scale input means (3 of FIG. 1; S426 of FIG. 15) for inputting a scale for the solid body, wherein the cross-sectional area calculating means calculates an area of a plane of intersection of the solid body displayed in three-dimensionally on the display means and a plane parallel to a predetermined plane on a scale input by the scale input means to calculate a cross-sectional area of the solid body for each predetermined slicing width (2 of FIG. 1; S430 of FIG. 15).

According to the volume calculating apparatus, the volume of any drawn solid body can be obtained by calculating its respective cross-sectional areas even when a functional expression representing the cross-sectional area is not given to thereby increase the utility of the volume calculating apparatus.

(14) The volume calculating apparatus may further comprise cross-sectional area function analyzing means (2 of FIG. 1; S435 of FIG. 15) for analyzing the respective cross-sectional areas calculated by calculating an area of a plane of intersection of the solid body displayed three-dimensionally on the display means and a respective one of planes parallel to a predetermined plane on the scale input by the scale input means to thereby obtain a functional expression representing the cross-sectional area in each measuring range, and wherein said volume display control means displays on the display means the volume of the solid body calculated by the calculating means, and the functional expression representing the cross-sectional area calculated by the cross-sectional area function analyzing means (S436 of FIG. 15).

According to the volume calculating apparatus, a functional expression representing the cross-sectional area of any drawn solid body can be calculated and displayed and hence the shape of the solid body can easily understood mathematically.

(15) A volume calculating apparatus comprises: display means (6 of FIG. 1) on which a body of rotation and its volume are displayed; measuring means (13 of FIG. 18A; S501 of FIG. 17) for measuring in a measuring range the distance between each of points on a side of the object and the rotational axis; shape function analyzing means (2 of FIG. 1; S506 of FIG. 17) for calculating a functional expression which represents a curve or a straight line which constitutes a side of the object based on the distance measured by the measuring means; calculating means (2 of FIG. 1; S508 of FIG. 17) for calculating the volume of a body of rotation produced when a figure represented by the functional expression which was calculated by the shape function analyzing means is rotated around the rotational axis in the measuring range; volume display control means (2 of FIG. 1; S510 of FIG. 17) for displaying on the display means the volume of a body of rotation calculated by the calculating means; and solid body display control means (2 of FIG. 1; S507 of FIG. 17) for displaying the produced body of rotation three-dimensionally on the display means.

According to the volume calculating apparatus, the distances from respective points on a side of the object and the rotational axis are measured, a functional expression which represents a curve or a straight line which constitutes a side of the object is calculated, the volume of a body of rotation is calculated which is produced when the figure represented by the calculated functional expression is rotated around the rotational axis in a specified range along the rotational axis, the volume of the calculated volume of the body of rotation is displayed on the display means, and the produced body of rotation is also displayed three-dimensionally.

Thus, by measuring a shape of a part of an actual object present outside the volume calculating apparatus, the shape of the object can be expressed by a functional expression, the volume of the object can be calculated, and hence the object can be analyzed easily and efficiently.

What is claimed is:

1. A volume calculating apparatus comprising:
   a display unit;
   input means for inputting functional expression data;
   figure display control means for displaying on the display unit a first figure expressed by first functional expression data input by said functional expression data inputting means;

range specifying means for specifying a range of the first figure;

calculating means for calculating a first volume of a first body of rotation produced when the first figure is rotated around a first rotational axis in the range specified by said range specifying means; and volume display control means for displaying the first volume of the first body of rotation calculated by the calculating means;

angle analysis means for calculating an angle between the first rotational axis and a coordinate axis;

rotary matrix producing means for producing a rotary matrix for the angle calculated by the angle analysis means;

linearly transforming means for linearly transforming the first functional expression data, the first rotational axis and lines indicative of the range of the first figure to second functional expression data, a second rotational axis, and lines indicative of a second range, respectively, based on the rotary matrix produced by the rotary matrix producing means; and transformed expression display control means for displaying on the display unit the rotary matrix produced by the rotary matrix producing means and the second functional expression data;

wherein the calculating means calculates a second volume of a second body of rotation produced when a second figure expressed by the second functional expression data is rotated around the second rotational axis in the second range; and wherein in addition to the first figure, the figure display control means also displays the second figure and the second volume of the second body of rotation on the display unit.

2. The volume calculating apparatus according to claim 1, further comprising:

straight line input means for inputting functional expression data indicative of a straight line; and wherein the first rotational axis comprises the straight line.

3. The volume calculating apparatus according to claim 1, wherein the first and second bodies of rotation are displayed two-dimensionally on the display unit.

4. The volume calculating apparatus according to claim 1, wherein the first and second bodies of rotation are displayed three-dimensionally on the display unit.

5. The volume calculating apparatus according to claim 1, further comprising rotation display control means for displaying on the display unit a change with time in the first figure when the first figure is rotated around the first rotational axis in a predetermined direction.

6. The volume calculating apparatus according to claim 1, wherein the first rotational axis and the second rotational axis are displayed so as to be distinguishable from the first body of rotation and the second body of rotation, respectively.

7. A volume calculating apparatus comprises:

a display unit;

functional expression data input means for inputting functional expression data;

figure display control means for displaying on the display unit a figure represented by the functional expression data which was input by the functional expression data input means;

intersection calculating means for calculating coordinates of intersections of the figure and a predetermined rotational axis;

intersection number determining means for determining the number of intersections calculated by the intersection calculating means;

volume calculating means for calculating a volume of a body of rotation produced when a part of the figure surrounded by an outline of the figure and the rotational axis is rotated around the rotational axis and when the determined number of intersections is two; and volume display control means for displaying on the display unit the volume of the body of rotation calculated by the calculating means.

8. A volume calculating apparatus comprising:

a display unit;

measuring means for measuring in a measuring range a distance between each of points on a side of an object and a rotational axis;

shape function analyzing means for calculating a functional expression which represents a curve or a straight line which constitutes the side of the object based on the distance measured by the measuring means;

calculating means for calculating a volume of a body of rotation produced when a figure represented by the functional expression which was calculated by the shape function analyzing means is rotated around the rotational axis in the measuring range;

volume display control means for displaying on the display unit the volume of the body of rotation calculated by the calculating means; and solid body display control means for displaying the body of rotation three-dimensionally on the display unit.

9. A computer program comprising:

code for inputting functional expression data;

code for displaying on a display unit a figure represented by the input functional expression data;

code for calculating coordinates of intersections of the figure and a predetermined rotational axis;

code for determining the calculated number of intersections;

code for calculating a volume of a body of rotation produced when a part of the figure surrounded by an outline of the figure and the rotational axis is rotated around the rotational axis and when the determined number of intersections is two; and code for displaying on the display unit the calculated volume of the body of rotation.

10. A computer program comprising:

code for displaying an object on a display unit;

code for measuring in a measuring range a distance between each of points on a side of the object and a rotational axis;

code for calculating a functional expression which represents a curve or a straight line which constitutes the side of the object based on the measured distance;

code for calculating a volume of a body of rotation produced when a figure represented by the calculated functional expression is rotated around the rotational axis in the measuring range;

code for displaying on the display unit the calculated volume of the body of rotation; and code for displaying the body of rotation three-dimensionally on the display unit.

* * * * *